United States Patent
McGuire et al.

(10) Patent No.: US 9,330,182 B2
(45) Date of Patent: May 3, 2016

(54) SOCIAL NETWORK ANALYSIS

(71) Applicant: 3DEGREES LLC, Plano, TX (US)

(72) Inventors: Heather A. McGuire, Plymouth Meeting, PA (US); Michael J. Markus, Plymouth Meeting, PA (US); Peter M. Kionga-Kamau, Charlottesville, VA (US); Brian N. Smith, Plymouth Meeting, PA (US)

(73) Assignee: 3DEGREES LLC, Plano, TX (US)

( * ) Notice: Subject to any disclaimer, the term of this patent is extended or adjusted under 35 U.S.C. 154(b) by 0 days.

(21) Appl. No.: 13/777,203

(22) Filed: Feb. 26, 2013

(65) Prior Publication Data

US 2013/0179442 A1    Jul. 11, 2013

Related U.S. Application Data

(63) Continuation of application No. 11/686,394, filed on Mar. 15, 2007, now Pat. No. 8,412,706, which is a continuation of application No. PCT/US2004/030259, filed on Sep. 15, 2004.

(51) Int. Cl.
G06F 17/30 (2006.01)
G06Q 10/10 (2012.01)

(52) U.S. Cl.
CPC .......... *G06F 17/30867* (2013.01); *G06Q 10/10* (2013.01)

(58) Field of Classification Search
USPC ........................................................ 707/734
See application file for complete search history.

(56) References Cited

U.S. PATENT DOCUMENTS

| | | | |
|---|---|---|---|
| 3,509,930 | A | 5/1970 | Martain |
| 4,640,329 | A | 2/1987 | Nakasaki et al. |
| 4,790,366 | A | 12/1988 | Kadota |
| 5,309,355 | A | 5/1994 | Lockwood |
| 5,576,951 | A | 11/1996 | Lockwood |
| 5,911,687 | A | 6/1999 | Sato et al. |
| 6,016,475 | A | 1/2000 | Miller et al. |
| 6,103,275 | A | 8/2000 | Seitz et al. |
| 6,108,493 | A | 8/2000 | Miller et al. |
| 6,151,581 | A | 11/2000 | Kraflson et al. |
| 6,175,831 | B1 | 1/2001 | Weinreich et al. |
| 6,223,165 | B1 | 4/2001 | Lauffer |

(Continued)

FOREIGN PATENT DOCUMENTS

| | | |
|---|---|---|
| EP | 1288795 | 3/2003 |
| EP | 1338966 | 8/2003 |

(Continued)

OTHER PUBLICATIONS

"A Model of Network Capitalism: Basic Ideas and Post-Soviet Evidence", Journal of Economic Issues, Mar. 2004, vol. 38, No. 1, pp. 85-111.

(Continued)

*Primary Examiner* — Ajay Bhatia
*Assistant Examiner* — Kurt Mueller
(74) *Attorney, Agent, or Firm* — Fay Sharpe LLP

(57) ABSTRACT

This invention is generally directed to one or more systems or methods relating to social network analysis. More specifically, this invention is generally directed to one or more systems or methods relating to personal communication networks and the analysis of personal-communication-network data.

20 Claims, 8 Drawing Sheets

(56) References Cited

U.S. PATENT DOCUMENTS

| | | |
|---|---|---|
| 6,269,369 B1 | 7/2001 | Robertson |
| 6,302,844 B1 | 10/2001 | Walker et al. |
| 6,327,590 B1 | 12/2001 | Chidlovskii et al. |
| 6,438,539 B1 | 8/2002 | Korolev et al. |
| 6,508,604 B1 | 1/2003 | Bechmann et al. |
| 6,549,937 B1 | 4/2003 | Auerbach et al. |
| 6,594,654 B1 | 7/2003 | Salam et al. |
| 6,658,431 B1 | 12/2003 | Norman, Jr. |
| 6,709,681 B2 | 3/2004 | Benjamin et al. |
| 6,714,916 B1 | 3/2004 | Robertson et al. |
| 6,728,681 B2 | 4/2004 | Whitham |
| 6,745,178 B1 | 6/2004 | Emens et al. |
| 6,772,139 B1 | 8/2004 | Smith, III |
| 6,931,604 B2 | 8/2005 | Lane |
| 6,947,922 B1 | 9/2005 | Glance |
| 6,965,313 B1 | 11/2005 | Saylor et al. |
| 7,047,202 B2 | 5/2006 | Jaipuria et al. |
| 7,069,308 B2 | 6/2006 | Abrams |
| 7,406,659 B2 | 7/2008 | Klein et al. |
| 7,478,078 B2 | 1/2009 | Lunt et al. |
| 7,613,769 B1 | 11/2009 | Hess |
| 7,702,685 B2 | 4/2010 | Shrufi et al. |
| 7,788,260 B2 | 8/2010 | Lunt et al. |
| 7,801,971 B1 | 9/2010 | Amidon et al. |
| 8,010,458 B2 | 8/2011 | Galbreath et al. |
| 8,302,164 B2 | 10/2012 | Lunt |
| 2001/0053986 A1 | 12/2001 | Dick |
| 2002/0023230 A1 | 2/2002 | Bolnick et al. |
| 2002/0049828 A1 | 4/2002 | Pekarek-Kostka |
| 2002/0059201 A1 | 5/2002 | Work |
| 2002/0082919 A1 | 6/2002 | Landau et al. |
| 2002/0091667 A1 | 7/2002 | Jaipuria et al. |
| 2002/0116466 A1 | 8/2002 | Trevithick et al. |
| 2002/0120609 A1* | 8/2002 | Lang et al. .................. 707/1 |
| 2002/0123053 A1 | 9/2002 | Luo et al. |
| 2002/0124053 A1 | 9/2002 | Adams et al. |
| 2002/0135614 A1 | 9/2002 | Bennett |
| 2002/0169737 A1 | 11/2002 | Armstrong et al. |
| 2003/0009440 A1 | 1/2003 | Inaba et al. |
| 2003/0167324 A1 | 9/2003 | Famham et al. |
| 2003/0208578 A1 | 11/2003 | Taraborelli et al. |
| 2004/0073476 A1* | 4/2004 | Donahue et al. ............. 705/10 |
| 2004/0088312 A1 | 5/2004 | Elder et al. |
| 2004/0088325 A1 | 5/2004 | Elder et al. |
| 2004/0122681 A1 | 6/2004 | Ruvolo et al. |
| 2004/0122803 A1 | 6/2004 | Dom et al. |
| 2004/0137882 A1 | 7/2004 | Forsyth |
| 2004/0148275 A1 | 7/2004 | Achlioptas |
| 2004/0153336 A1 | 8/2004 | Virdee et al. |
| 2004/0176993 A1 | 9/2004 | Rajasingham |
| 2004/0215793 A1 | 10/2004 | Ryan et al. |
| 2004/0255237 A1 | 12/2004 | Tong |
| 2005/0021630 A1 | 1/2005 | Cannata et al. |
| 2005/0021750 A1 | 1/2005 | Abrams |
| 2005/0027566 A1 | 2/2005 | Haskell |
| 2005/0027802 A1 | 2/2005 | Madsen et al. |
| 2005/0080854 A1 | 4/2005 | Tervo |
| 2005/0091202 A1 | 4/2005 | Thomas |
| 2005/0131909 A1 | 6/2005 | Cavagnaro et al. |
| 2005/0171799 A1 | 8/2005 | Hull et al. |
| 2005/0197846 A1 | 9/2005 | Pezaris et al. |
| 2005/0198305 A1 | 9/2005 | Pezaris et al. |
| 2005/0210102 A1* | 9/2005 | Johnson et al. ............... 709/204 |
| 2005/0216550 A1 | 9/2005 | Paseman et al. |
| 2005/0216919 A1 | 9/2005 | Hull et al. |
| 2005/0234953 A1 | 10/2005 | Zhang et al. |
| 2005/0246420 A1 | 11/2005 | Little |
| 2005/0283473 A1 | 12/2005 | Rousso et al. |
| 2006/0005113 A1 | 1/2006 | Baluja et al. |
| 2006/0026147 A1 | 2/2006 | Cone et al. |
| 2006/0036587 A1 | 2/2006 | Rizk et al. |
| 2006/0042483 A1 | 3/2006 | Work et al. |
| 2006/0064431 A1 | 3/2006 | Kishore et al. |
| 2006/0112111 A1 | 5/2006 | Tseng et al. |
| 2006/0117378 A1 | 6/2006 | Tam et al. |
| 2006/0218153 A1 | 9/2006 | Voon et al. |
| 2006/0235873 A1 | 10/2006 | Thomas |
| 2006/0242574 A1 | 10/2006 | Richardson et al. |
| 2006/0259957 A1 | 11/2006 | Tam et al. |
| 2006/0294134 A1 | 12/2006 | Berkhim et al. |
| 2006/0294192 A1 | 12/2006 | Mao et al. |
| 2007/0067392 A1 | 3/2007 | Torres et al. |
| 2007/0112719 A1 | 5/2007 | Reich et al. |
| 2007/0130164 A1 | 6/2007 | Kembel et al. |
| 2007/0192461 A1 | 8/2007 | Reich et al. |
| 2007/0214097 A1 | 9/2007 | Parsons et al. |
| 2007/0226248 A1 | 9/2007 | Darr |
| 2007/0245245 A1 | 10/2007 | Blue et al. |
| 2007/0260599 A1 | 11/2007 | McGuire et al. |
| 2008/0046458 A1 | 2/2008 | Tseng et al. |
| 2008/0091834 A1 | 4/2008 | Norton |
| 2008/0104225 A1 | 5/2008 | Zhang et al. |
| 2008/0104679 A1 | 5/2008 | Craig |
| 2008/0189621 A1 | 8/2008 | Reich et al. |
| 2008/0189768 A1 | 8/2008 | Callahan et al. |
| 2008/0201447 A1 | 8/2008 | Kim |
| 2008/0255989 A1 | 10/2008 | Altberg et al. |
| 2008/0301114 A1 | 12/2008 | Hibbets et al. |
| 2009/0018903 A1 | 1/2009 | Iyer |
| 2009/0070665 A1 | 3/2009 | Chijiiwa et al. |
| 2009/0070684 A1 | 3/2009 | Aldrich et al. |
| 2009/0070852 A1 | 3/2009 | Chijiiwa et al. |
| 2009/0234711 A1 | 9/2009 | Ramer et al. |

FOREIGN PATENT DOCUMENTS

| | | |
|---|---|---|
| EP | 1338967 | 8/2003 |
| JP | 04163209 | 6/2004 |
| WO | WO 99/23591 | 5/1999 |
| WO | WO 00/68860 | 11/2000 |
| WO | WO 01/16839 | 3/2001 |
| WO | WO 01/86484 | 11/2001 |
| WO | WO 03/030051 | 4/2003 |
| WO | WO 03/052621 | 6/2003 |
| WO | WO 2004/061612 | 7/2004 |
| WO | WO 2005/006152 | 1/2005 |
| WO | WO 2005/013058 | 2/2005 |
| WO | WO 2005/029362 | 3/2005 |

OTHER PUBLICATIONS

Bardon, Debbie, "Online Social Networking for Business: An Interview with Konstantin Guericke Marketing VP, LinkedIn Interview", Online, Nov. 1, 2004, No. 6, vol. 28, p. 25.

Dickie, Jim, Is Social Networking an Overhyped Fad or a Usefull Tool? When Put to the Test, This Sales and Marketing Application Delivers: Reality Check, CRM Magazine, Feb. 1, 2005, vol. 9, p. 20.

Dvorak, John C., "The New Networking Crock: This is Plan, Old-Fashioned, Hopeless, Silicon Valley Utopianism at Work. Grab Hold of Your Wallets and Hold on for Dear Life!", PC Magazine.com, Feb. 11, 2004.

Fitzgerald, Michael, "Internet Working", Technology Review, Apr. 1, 2004, vol. 107, No. 3, p. 44.

Frauenfelder, Mark, "Sir Tim Berners-Lee He Created the Web. Now He's Working on Internet 2.0", Technology Review, Oct. 2004, pp. 40-45.

Gathier, Chris, 'West Coast Social Networking' Web Sites Attract Users, Investors, Boston Globe, Dec. 7, 2003.

Greenbaum, Joshua, "Circle of Friends: Social Networking Software Can Help Enterprises Take Advantage of Existing Relationships, Both Internally and Externally", Intelligent Enterprise, Apr. 3, 2004, p. 36.

Harney, John, Social Networks in Sales: Social Network Software Tells Salespeople Who in Their Organization Knows Whom Within a Company They're Trying to Sell to and Then They Can Use the Intermediary to Broker a Sale', KM World, Jun. 1, 2004, No. 6, vol. 13, p. 16.

Herman, Jim, "The New Science of Networks", Business Communications Review, Jun. 1, 2003, No. 6, vol. 33, p. 22.

Hicks, Matt, "Spoke Revs Hosted Enterprises Social Networking Application: The Startup Plans to Offer Spoke Workgroups in the

(56) References Cited

OTHER PUBLICATIONS

Spring for Smaller Sales Teams that Want to Tap into Social Networking Without Deploying Software", eWeek.com, Mar. 4, 2004.
Hicks, Matt, "Social Networking Stretches its Reach" Two Smaller Companies Move to Integrate the Concept of Mapping Social Connections with Mobile-Phone Text Messaging and With Web Conferencing, eWeek.com, Apr. 8, 2004.
Lee, Ellen, "New 'Social Networking' Sites Help Land Jobs in San Francisco Area", Contra Costa Times, Sep. 17, 2004.
Padgett, Lauree, "Networking Migrating and Aggravating: In Other Words, Discusses Migrating Library Systems, Malware Tools, Social Networking", Information Today, Mar. 1, 2004, No. 3, vol. 21, p. 40.
Pankhurst, Steve, "Social Networks Run on Trust, As Do We At Friends Reunited", Revolution, Feb. 9, 2004, p. 13.
Schofield, Jack, "Software to Help you Network", Computer Weekly, Mar. 16, 2004, p. 32.
Solheim, Shelley, "Social-Networking Vendors Set Their Sights on the Enterprise", eWeek.com, Mar. 19, 2004.
Solheim, Shelley, "Let's Keep in Touch: Social Network Tools Take Air at Enterprise Sales." eWeek, News & Analysis, Mar. 29, 2004, p. 31.
Solomon, Marc, "Searching Becomes Conversing: Social Networking Application for Sales, Recruiting, etc.", Searcher, Mar. 1, 2004, No. 3, vol. 12, p. 16.
Smith, Philip, "Marketing Promise of Social Sites", Revolution, Apr. 21, 2004, p. 17.
Topper, Elisa F., Working Knowledge: Putting Networks to Work: Professional Development, American Libraries, Dec. 1, 2003, No. 11, vol. 34, p. 88.
Whaley, Charles, "Six Degrees of Separation Takes on an Electronic Spin: Social Networking Via the Web is All the Rage, and Venture Capitalists of Throwing Handfuls of Money at Startups", Computing Canada, Mar. 26, 2004, No. 4, vol. 30, p. 13.
International Search Report for WO 2006/036165 (Application No. PCT/US04/38064); Mar. 9, 2006.
International Search Report for WO 2006/036187 (Application No. PCT/US05/06617); May 8, 2007.
International Search Report for W02006/036216 (Application No. PCT/US05/15952); Aug. 25, 2006.
International Search Report for W02006/041425 (Application No. PCT/US04/30259); May 30, 2006.
International Search Report for W02006/055555 (Application No. PCT/US05/41349); Jun. 1, 2006.
International Search Report for W02006036186 (Application No. PCT/US2005/005847); Apr. 21, 2006.
International Search Report for W02007005463 (Application No. PCT/US06/25166); Dec. 14, 2007.
Written Opinion for WO 2006/036187 (Application No. PCT/US05/06617); May 8, 2007.
Written Opinion for W02006/036165 (Application No. PCT/US04/38064); Mar. 9, 2006.
Written Opinion for W02006/036216 (Application No. PCT/US05/15952); Aug. 25, 2006.
Written Opinion for W02006/041425 (Application No. PCT/US04/30259); May 30, 2006.
Written Opinion for W02006/055555 (Application No. PCT/US05/41349; Jun. 1, 2006.
Written Opinion for W02007005463 (Application No. PCT/US06/25166); Dec. 14, 2007.
Written Opinion W02007016252 (Application No. PCT/US06/29210); Jul. 13, 2007.
Written Opinion for W02006036186 (Application No. PCT/US2005/005847); Apr. 21, 2006.
International Search Report for W02007016252 (Application No. PCT/US06/29210); Jul. 13, 2007; Applicant S.MAR.T. Link Medical, Inc.
Google search of "totally random keywords", May 14, 2009.
Markus, Michael J., "Collection of Linked Databases"; Final Office Action issued in U.S. Appl. No. 11/686,421.
Markus, Michael J., "Collection of Linked Databases"; Office Action issued in U.S. Appl. No. 11/686,416.
Markus, Michael J., "Collection of Linked Databases"; Office Action issued in U.S. Appl. No. 11/686,421.
Markus, Michael J., "Collections of Linked Databases"; Final Office Action issued in U.S. Appl. No. 11/686,409.
Markus, Michael J., "Collections of Linked Databases"; Final Office Action issued in U.S. Appl. No. 11/686,416.
Markus, Michael J., "Collections of Linked Databases"; Final Office Action issued in U.S. Appl. No. 11/686,429.
Markus, Michael J., "Collections of Linked Databases"; Non-Final Office Action issued in U.S. Appl. No. 11/686,409.
Markus, Michael J., "Collections of Linked Databases"; Office Action issued in U.S. Appl. No. 11/686,429.
Markus, Michael J., "Collections of Linked Databases and Systems and Methods for Communicating About Updates Thereto"; Non-Final Office Action issued in U.S. Appl. No. 11/989,039.
Markus, Michael J., "Social Network Analysis"; Final Office Action issued in U.S. Appl. No. 11/686,401.
McGuire, Heather A., "Social Network Analysis"; Final Office Action issued in U.S. Appl. No. 11/686,394.
McGuire, Heather A., "Social Network Analysis"; Office Action issued in U.S. Appl. No. 11/686,394.

* cited by examiner

EXAMPLE (I)

EXAMPLE (II)

SOCIAL NETWORK ANALYSIS

CROSS REFERENCE TO RELATED APPLICATIONS

This application is a continuation of U.S. patent application Ser. No. 11/686,394, filed Mar. 15, 2007, which is a continuation of International Application No. PCT/US2004/030259, filed Sep. 15, 2004, the disclosures of which are incorporated herein by reference in their entirety.

FIELD OF THE INVENTION

This invention is generally directed to one or more systems or methods relating to social network analysis. More specifically, this invention is generally directed to one or more systems or methods relating to personal communication networks and the analysis of personal-communication-network data.

BACKGROUND OF THE INVENTION

When seeking information, many people rely upon sources such as the internet, intranets, pamphlets, magazines, and advertisements to provide them with adequate information and ultimately to aid in their decision-making process. In their searches, however, to such sources often include barriers that prevent people from acquiring the valid, reliable and useful information they need. Notably, the anonymity of the internet prevents people from trusting the reliability of the information source. Clearly, most people would rather consult their friends and colleagues that they know and trust on a first name basis—or knowledgeable people that they know through their friends and colleagues—when seeking the answer to a particular question. For example, it is well known that informal communication via personal communication networks allows decision makers to reduce the uncertainty regarding unfamiliar technologies and/or products by questioning and consulting trusted others. Posing questions to the members of one's personal communication network allows individuals to obtain first, second, and third-hand accounts from individuals they know directly or through intermediaries. Theoretically, the varied experiences of one's network of peers, acquaintances, and people connected to the person through countless others should more than adequately serve to answer one's questions. Unfortunately, experiential and other knowledge can be difficult to procure; because people are unaware of who in their interpersonal network has experience or information regarding the information they seek, informal searches for advice can seem arbitrary, unfocused, and inefficient. The absence of a formal map or knowledge of communication structure prevents the person from realizing the full potential of the collective IQ of his network of friends and colleagues.

Social network analysis is known and has been described as the mapping and measuring of relationships and flows between people, groups, organizations, computers, or other information/knowledge processing entities.

Social network analysis (SNA) can be used to generate data and draw conclusions based upon the flow of information (or other resources) within a social network. SNA maps the relationships of people within a social network in order to monitor, understand, and utilize the informational flow within the network—who do people get their information from and who do they give it to? A social network is distinct from an organizational chart because the organizational chart shows formal relationships—who works where and who reports to whom. On the other hand, a social-network-analysis map shows more informal relationships—who knows who and who do they share information with. SNA therefore facilitates visualizing and understanding personal relationships that can either facilitate or impede knowledge creation and sharing.

While social network analysis is known, little has been done to streamline its use in an effort to maximize its potential. Further, implementations of social-network analysis have yet to be fully explored. Specifically, most individuals interested in social network data have merely conducted interviews or surveys to obtain the data, and they have then kept the conclusions drawn from such data exclusively in the world of academia. For example, sociologists who studied the diffusion of hybrid seeds through the social networks of farmers in Iowa published their findings in academic journals. They did not, however, disclose the conclusions that they reached based on the analysis of their data to the general public.

SNA is gaining popularity in the field of marketing in order to facilitate the diffusion of innovations (e.g., new products) through customer networks. To this end, a number of companies have conducted preliminary data analyses using SNA in an attempt to map customer networks and determine who most customers contact for advice within a particular domain. In theory, if a company can identify and market to the small percentage of people that make up the opinion leadership or opinion leaders within a given customer network, they can lower both the cost of marketing and the time it takes for the innovation to diffuse through the customer network. Marketing departments are therefore anxious to identify "opinion leaders" within a given field. Such individuals are often highly connected "hubs" within a social network web, and they are important targets for marketing because other members in the customer network often go to them for advice regarding the latest trends and innovations. Clearly, the ability to selectively target opinion leaders, which may cut advertising and marketing costs while simultaneously increasing the effectiveness of marketing messages, would be highly beneficial. However, with current technology, collecting, mapping, and identifying what role each potential customer plays within a given network demands considerable time, effort, and money-making such an approach prohibitive to all but a few companies.

While companies first demonstrated interest in the utility of SNA for targeted marketing in the 1950's, prior-art technology is slow and cumbersome. Most recently in the pharmaceutical domain, some pharmaceutical companies gathered relational information within the medical field by sending a two-page survey to approximately 800,000 physicians in the United States. The pharmaceutical companies paid each participating physician approximately $250 for their time, but the survey yielded only a 5% to 8% response rate—this equates to a one time $10,000,000 to $16,000,000 data-collection procedure. Further limitations on the accuracy or utility of such a strategy include the "static" nature of a one-time survey that fails to capture the dynamic nature of social networks.

Additional prior-art methods for performing SNA exist. One prior art method attempts to draw an inference on who is well known and influential within the field of medicine based on general publications, conference presentations and disclosures. This prior-art method is clearly limited because of its highly inferential nature and its lack of a social-network map that clearly depicts the informal and formal communication links between physicians. In other words, the approach is lacking because the data does not directly and clearly correspond to advice, influence, or communication among physicians. Clearly, a new approach to the collection of reliable, valid, meaningful, and cost-effective social-network data is needed.

In the domains of leisure and entertainment, parlor games such as "Six Degrees of Kevin Bacon" and websites such as "Friendster" and "LinkedIn" have demonstrated the ability of the internet to create social networks of friends and business associates for the purposes of making friends, finding dates, identifying potential job candidates, and seeking employment. A major drawback of such popular social-network sites, however, is the seemingly arbitrariness of the links between users. Allowing "friends" to link to one another in a situation that almost promotes competition to score high volumes of links creates a chaotic environment wherein the context, strength, or value of relationships between users cannot be ascertained. Arbitrary links undermine the utility of social networks that purport to connect people to trustworthy second and third-degree contacts premised upon mutual "friends." Therefore, the data captured and utilized by these websites is highly unreliable. Because the websites have not set parameters, guidelines, or norms to govern or define the links between users, the social networks generated by these sites provide limited aid to users and are nearly useless to parties interested in using social-network data for their own purposes.

Prior-art methods for inviting new people into social networks online or indicating first-degree contacts via a survey typically lack the sophistication to accurately capture the directionality of an established social-network link. It is generally known that social-network links can be either unidirectional (e.g., from A to B) or bi-directional (e.g., from A to B and from B to A). Reliable, valid, and meaningful social-network data typically necessitates the directionality of the links within a social-network. Establishing and recording accurate directionality information about social-network links increases both the meaning and utility of a social-network map and social-network data generated therefrom. Prior-art methods for inviting (or listing) people into a social network often erroneously or prematurely infer bi-directional relationships—and misinterpretation of the directionality of a link leads to misleading information.

More specifically, prior-art methods directed to determining the directionality of social-network links do not provide a means to confirm the actual existence of a unidirectional or bi-directional link. For example, in the prior art, a first person will typically declare that a second person is linked to the first person, and as a result, the second person is incorporated into the first person's social network as a unidirectional or bi-directional link. Note that the prior-art methods don't provide for providing a means for confirming the existence or directionality of the link. In other words, the prior art doesn't provide for a method by which the second person can confirm or deny the relationship that the first person has alleged. Further, if a first person listed a second person as a member of the first person's social network, then the prior art doesn't provide a way to consult the second person as a means to confirm the relationship. The art therefore needs a more accurate method for determining the directionality of a social-network link.

Relatedly, prior-art internet search engines are typically designed to match search criteria—general words, names, phrases, etc.—with a list of "best fit" websites, based upon keywords and the popularity of the websites. The recent application of social networks to such search engines has introduced the concept of including evaluation of websites by an individual's contacts in the ranked presentation of the "best fit" websites. There still, however, remains a need in the art for an electronic search engine that can both: identify individuals in a field of interest that have knowledge regarding the searched topic and how the searcher is connected through a set of intermediaries to the individual that possesses the knowledge, and allows the searcher to ascertain the degree to which the person and information can be trusted.

SUMMARY OF THE INVENTION

In general, the present invention provides a method for classifying at least one personal-communication-network member as an opinion leader in a field of interest by using personal-communication-network data, the method comprising the step: classifying at least one personal-communication-network member as an opinion leader in a field of interest based upon personal-communication-network data.

The present invention further provides a method for classifying at least one personal-communication-network member as an opinion leader in a field of interest by using personal-communication-network data, the method comprising the step: classifying at least one person as an opinion leader in a field of interest based upon the quantity of memberships that the at least one person has in personal communication networks, wherein all of the networks have the field of interest in common.

The present invention further provides a method for classifying at least one personal-communication-network member as an opinion leader in a field of interest by using personal-communication-network data, the method comprising the step: classifying a person as an opinion leader within a field of interest based upon the quantity of electronic communications that the person has sent to personal-communication-network members in the field of interest.

The present invention further provides a method for classifying at least one personal-communication-network member as an opinion leader in a field of interest by using personal-communication-network data, the method comprising the step: classifying a person as an opinion leader within a field of interest based upon the quantity of electronic communications that the person has received from personal-communication-network members in the field of interest.

The present invention further provides a method for classifying at least one personal-communication-network member as an opinion leader in a field of interest by using personal-communication-network data, the method comprising the step: classifying a person as an opinion leader in a field of interest based upon a variable selected from the group consisting of: the quantity of communications between nodes, the frequency of communication between nodes, the number of words in a communication between nodes, the direction of communication between nodes, the number of key words in a communication between nodes, and combinations thereof.

The present invention further provides a system for classifying at least one personal-communication-network member as an opinion leader in a field of interest by using personal-communication-network data, the system comprising: a means for classifying at least one personal-communication-network member as an opinion leader in a field of interest based upon data generated from the person's participation or interaction with the at least one personal communication network.

The present invention further provides a system for classifying at least one personal-communication-network member as an opinion leader in a field of interest by using personal-communication-network data, the system comprising: a means for classifying at least one personal-communication-network member as an opinion leader in a field of interest based upon the quantity of memberships that the at least one personal-communication-network member has in personal communication networks, wherein all of the networks have the field of interest in common.

The present invention further provides a system for classifying at least one personal-communication-network member as an opinion leader in a field of interest by using personal-communication-network data, the system comprising: a means for classifying a person as an opinion leader within a field of interest based upon the quantity of electronic communications that the person has sent to personal-communication-network members in the field of interest.

The present invention further provides a system for classifying at least one personal-communication-network member as an opinion leader in a field of interest by using personal-communication-network data, the system comprising: a means for classifying a person as an opinion leader within a field of interest based upon the quantity of electronic communications that the person has received from personal-communication-network members in the field of interest.

The present invention further provides a system for classifying at least one personal-communication-network member as an opinion leader in a field of interest by using personal-communication-network data, the system comprising: a means for classifying a person as an opinion leader in a field of interest based upon a variable selected from the group consisting of: the quantity of communications between nodes, the frequency of communication between nodes, the number of words in a communication between nodes, the direction of communication between nodes, the number of key words in a communication between nodes, and combinations thereof.

The present invention further provides a method for assessing a person's likelihood to use a concept or product that is new to the person, the method comprising the step: classifying a person's innovativeness based upon the quantity of personal-communication-network invitations the person has received from a personal-communication-network member.

The present invention further provides a system for assessing a person's likelihood to use a concept or product that is new to the person, the system comprising: a means for classifying a person's innovativeness based upon the quantity of personal-communication-network invitations the person has received from a personal-communication-network member.

The present invention further provides a system for assessing a person's likelihood to use a concept or product that is new to the person, the system comprising: a means for classifying a person's innovativeness based upon the length of time required for the person to respond to a personal-communication-network invitation.

The present invention further provides a method for determining a topic of discussion between two personal-communication-network members, the method comprising the steps: recording an electronic communication from one personal-communication-network member to another personal-communication-network member; and quantifying or qualifying the use of a key word or key phrase within the electronic communication.

The present invention further provides a method for evaluating a relationship between two personal-communication-network members comprising the step: evaluating a relationship between two personal-communication-network members by quantifying the number of electronic communications between the members, recording the frequency of electronic communication between the members, recording the number of words in an electronic communication between the members, recording the direction of communication between the members, recording the use of keywords in an electronic communication between the members, or a combination thereof.

The present invention further provides a method for using a single term or phrase to initiate a multi-term search of personal-communication-network data, the method comprising the step: searching personal-communication-network data for multiple terms or phrases by initiating a multi-term search of the data using one search term or phrase, wherein the one search term or phrase initiates the use of one or more second search terms or search phrases in the search.

The present invention further provides a method for defining the directionality of a link between nodes in a personal-communication-network comprising the step: defining a personal-communication-network link as unidirectional or bi-directional based upon whether an inviter wants to be a member of an invitee's personal communication network.

The present invention further provides a method for defining the directionality of a link between nodes in a personal-communication-network comprising the step: defining a personal-communication-network link as unidirectional or bi-directional by determining whether an original invitee wants to send a reciprocal invitation to an original inviter to become a member of the invitee's personal communication network.

The present invention further provides an invitation-and-acceptance method for creating a link in a personal communication network, the method comprising the step: sending an invitation from a personal communication network member to an invitee, wherein the personal communication network member indicates in the invitation at least one field of interest that the personal communication network member would like to communicate about with the invitee.

The present invention further provides a method for displaying search results of a personal-communication-network-data search, the method comprising the step: displaying the results of a personal-communication-network-data search by showing at least one personal-communication-network member that is identified by the search and how a party conducting the search is linked to the at least one personal-communication-network member identified by the search.

The present invention further provides a method for displaying search results of a personal-communication-network-data search, the method comprising the step: displaying the results of a personal-communication-network-data search by showing at least one personal-communication-network communication that is identified by the search and how a party conducting the search is linked to the at least one personal-communication-network communication identified by the search.

The present invention further provides a system for determining a topic of discussion between two personal-communication-network members, the system comprising: a means for recording an electronic communication from one personal-communication-network member to another personal-communication-network member; and a means for quantifying the use of a key word or key phrase within the electronic communication.

The present invention further provides a system for evaluating a relationship between two personal-communication-network members comprising: a means for evaluating a relationship between two personal-communication-network members by quantifying the number of electronic communications between the members, recording the frequency of electronic communication between the members, recording the number of words in an electronic communication between the members, recording the direction of communication between the members, recording the use of keywords in an electronic communication between the members, or a combination thereof.

The present invention further provides a system for defining the directionality of a link between nodes in a personal-communication-network comprising: a means for defining a personal-communication-network link as unidirectional or bi-directional based upon whether an inviter wants to be a member of an invitee's personal communication network.

The present invention further provides a system for defining the directionality of a link between nodes in a personal-communication-network comprising: a means for defining a personal-communication-network link as unidirectional or bi-directional based upon whether an inviter wants to be a member of an invitee's personal communication network.

The present invention further provides a system for defining the directionality of a link between nodes in a personal-communication-network comprising: a means for defining a personal-communication-network link as unidirectional or bi-directional by determining whether an original invitee wants to send a reciprocal invitation to an original inviter to become a member of the invitee's personal communication network.

The present invention further provides an invitation-and-acceptance system for creating a link in a personal communication network, the system comprising: a means for sending an invitation from a personal communication network member to an invitee, wherein the personal communication network member indicates in the invitation at least one field of interest that the personal communication network member would like to communicate about with the invitee.

The present invention further provides a system for displaying search results of a personal-communication-network data search, the system comprising: a means for displaying the results of a personal-communication-network data search by showing at least one personal-communication-network member that is identified by the search and how a party conducting the search is linked to the at least one personal-communication-network member identified by the search.

The present invention further provides a system for displaying search results of a personal-communication-network data search, the system comprising: a means for displaying the results of a personal-communication-network data search by showing at least one personal-communication-network communication that is identified by the search and how a party conducting the search is linked to the at least one personal-communication-network communication identified by the search.

The present invention further provides a system for identifying an opinion leader specialist physician within a social network of physicians on the basis of peer contacts and evaluations made through the network, the system comprising: a registration process for registering the identity and specialties of a plurality of physicians for inclusion in the network; an invitation and acceptance process for establishing links between physicians, an invitation including a message from a physician in the network to an invitee physician indicating a field of interest for which the invitee physician is invited for inclusion in the network, and accept, decline and reciprocate response options for the invitee physician, the response of the invitee physician determining a status of a link between physicians as unidirectional or bi-directional; and a network analyzer which identifies an opinion leader specialist physician by specialization and an accounting and evaluation of links in the social network which indicate an opinion leader specialist physician.

The present invention further provides a method for identifying a common field of interest between at least two personal-communication-network members, the method comprising the step: identifying a common field of interest between at least two personal-communication-network members based upon personal-communication-network data generated from communications during an invitation-and-acceptance process.

The present invention further provides a method for identifying a common field of interest between at least two personal-communication-network members, the method comprising the step: identifying a common field of interest between at least two personal-communication-network members based upon data generated from communications between the at least two personal-communication-network members.

The present invention further provides a system for identifying a common field of interest between at least two personal-communication-network members, the system comprising: a means for identifying a common field of interest between at least two personal-communication-network members based upon data generated from communications during an invitation-and-acceptance process.

The present invention further provides a system for identifying a common field of interest between at least two personal-communication-network members, the system comprising: a means for identifying a common field of interest between at least two personal-communication-network members based upon data generated from communications between the at least two personal-communication-network members.

The present invention further provides a system comprising: a means for searching personal-communication-network data.

The present invention further provides a system comprising: a means for displaying two or more different personal-communication-network paths from a first node to a second node in a personal communication network, wherein the two or more different paths start at the first node and end at the second node.

The present invention further provides a method for displaying search results of a personal-communication-network data search, the method comprising the step: displaying search results of a personal-communication-network data search, wherein the search results are displayed in a tabular form, wherein the tabular form has at least one horizontal row and at least one vertical column wherein the at least one row shows a social network path to a node, and the at least one column shows the degrees of separation between the node and the person that initiated the search.

The present invention further provides a method for a personal-communication-network member to organize personal-communication-network communications, the method comprising the step: having a personal-communication-network member archive a personal-communication-network communication into a personal-communication-network database that is searchable by personal-communication-network members, wherein the member designates a searchable term to be associated with the personal-communication-network communication, and wherein a keyword search of personal-communication-network data that uses the searchable term will return a search result that identifies the personal-communication-network communication.

The present invention further provides a method for organizing incoming personal-communication-network emails directed to a first personal-communication-network member from a second personal-communication-network member, the method comprising the step: redirecting an incoming personal-communication-network email invitation from a personal-communication-network member's primary email address to a second email address that is directed to receiving personal-communication-network email invitations.

This invention generally advances the art by providing an inventive embodiment that provides an explicit context for personal-communication-network links so that meaningful personal-communication-network data can be generated, e.g., linking network members that communicate regarding a common field of interest.

This invention further advances the art by providing an inventive embodiment that provides a real-time online social network or personal communication network—so that dynamic social-network data or personal-communication-network data is reflected in real-time data acquisition and analysis.

This invention further advances the art by providing an inventive embodiment that identifies differing degrees of innovativeness of social-network members or personal-communication-network members in order to create a detailed and efficient marketing strategy.

This invention further advances the art by providing an inventive embodiment for collecting social-network data or personal-communication-network data to supplement self-report data and using the data to create an accurate map of one or more social networks or personal communication networks.

This invention further advances the art by providing an inventive embodiment having an invitation-and-acceptance method that accurately portrays the directionality of social-network or personal-communication-network links.

This invention further advances the art by providing a system that enables direct searches of personal-communication-network data. System users may obtain the information they need (while increasing the reliability familiarity of the information source) and reach more accurate conclusions as a result of the data reliability.

The social search engine provide by the present invention is distinct from prior-art search engines because present invention's social search engine does not retrieve websites that match keywords, but provides the social-network or personal-communication-network members with who in their network has access, knowledge, or experience with that information relating to the search. For example, if a physician were to type in "leukemia," the social search engine would produce a list of physicians who specialize in leukemia—either researchers who study the disease, oncologists or hematologists who treat it, or physicians who have experience with medications or chemotherapy. In other words, the physician does not obtain a list of "specially ranked" websites by anonymous authors, but actually receives the names and profiles of other physicians (to whom they are linked) that may be considered experts on the topic and how the searcher is connected to the physicians who possess the information. Thus, a physician who is seeking information about leukemia is able to evaluate the information based on how he or she is socially connected to the target physician or how the physician named in the search is positioned within the searchers overall personal communication network.

The present invention further advances the art by using personal-communication-network to map in real-time communication networks, identifying opinion leaders, temporal changes in the network, the progression of communication through networks, and the impact of members' roles on the rate of the diffusion. Such knowledge will allow for the development of strategically targeted marketing campaigns or protocol/policy dissemination to facilitate the diffusion of ideas or innovations through targeted networks. More importantly, the present invention will allow entities to distinguish the unique characteristics and roles each member of the network plays in facilitating the diffusion of information through a consumer, citizen, staff, or other network and to recognize the importance of delivering a message at the right time, to the right people.

DEFINITIONS

A personal-communication-network member is a person that is a node in a personal communication network.

An opinion leader is a person that has an above-average ability to influence people in a field of interest.

A field of interest is an area of specialization.

Personal-communication-network data is any information related to or generated from a personal communication network. Nonlimiting examples of personal-communication-network data include: electronic invitations to current and/or new members of a personal-communication network, archives of personal-communication-network communications, persons that are personal-communication-network members, a communication generated from or directed to personal-communication-network member, a personal-communication-network member's FAQ's data, archived search terms generated by a personal-communication-network member, a personal-communication-network member's field of interest, keywords used by a personal-communication-network member, phrases used by a personal-communication-network member, personal-communication-network member names, a personal-communication-network member's specialty or field of interest, the context of a communication to or from a personal-communication-network member, a personal-communication-network member's geographic location, schools attended or general educational background information of a personal-communication-network member, a personal-communication-network member's graduation year, a personal-communication-network member's work location or place of business, a personal-communication-network member's profession, a personal-communication-network member's insurance information, a personal-communication-network member's clinical interests, a personal-communication-network member's research interests, a personal-communication-network member's patients or clients, or any combination thereof.

A personal communication network is a type of social network that is directed to and based upon communication links between nodes. A communication link can generally be described as a link between a first node and a second node, wherein the communication link is established or based upon the communication subject matter between the two nodes. Note that the link is not based solely upon the fact that a first node knows a second node, but instead the link is directed to a common field of interest between the first and second node. Further, a personal communication network is directed to identifying to whom a personal-communication-network member talks to regarding a particular subject or field of interest. Because a personal communication network has communication links that have been created based upon who a node communicates with and seeks advice from or gives advice to regarding the common field of interest, personal communication networks are also commonly referred to as trust networks.

A common field of interest is a field of interest that is shared by two or more people.

A person has a personal-communication-network membership when a person is a node in a personal communication network.

Keyword searching is a manner of searching that uses a string of characters in the search term or search phrase.

A third-degree contact is a social-network member or personal-communication-network member that is three-degrees-of-separation away from a specific member or node.

A second-degree contact is a social-network member or personal-communication-network member that is two-degrees-of-separation away from a specific member or node.

A first-degree contact is a social-network member or personal-communication-network member that is one-degree-of-separation away from a specific member or node.

Degrees of separation is a term that describes the relative position of two nodes in a social network. A second node is one degree of separation away from a first node if the second node is directly linked to the first node; stated differently, a second node is one degree of separation away from a first node if there are no other network nodes intervening between the second node and the first node. Further, a second node is two degrees of separation away from a first node if there is exactly one network node intervening between the second node and the first node. Still further, a second node is three degrees of separation away from a first node if there are exactly two network nodes intervening between the second node and first node. Yet further, a second node is n degrees of separation away from a first node if there are n−1 intervening network nodes between the second node and the first node.

A person's quantity of memberships in personal communication networks equals the number of times a person is identified as a node in one or more personal communication networks.

A node is a person that is a member of a social network or personal communication network.

The frequency of communication describes the number of communications between two people or two nodes over a period of time.

Direction of communication is a term that describes who sent a communication and who received the communication. The direction of communication is from the sender of a communication to the recipient of the communication.

Innovativeness is a relative term that describes the degree to which an individual is relatively earlier in adopting new ideas than other individuals that are members of a social system. Further, innovativeness is a characteristic that describes an individual's receptiveness in adopting a new innovation relative to other members of the population. Innovativeness depends upon many variables; and nonlimiting examples of those variables include risk-taking tendencies and knowledge of innovation. The levels of innovativeness (in decreasing order) are: innovators, early adopters, early majority, late majority, and laggards. Innovativeness can also describe an entity's receptiveness in adopting a new innovation relative to other entities. Nonlimiting examples of such entities include a consumer, hospital, corporation, insurance company, medical practice, and the like.

A personal-communication-network invitation is an invitation that invites a person or invitee to become a member or node of a personal communication network.

The directionality of a link (or direction of a link) is a term that describes a personal-communication-network link or social-network link. The directionality of a link is based upon identifying the person that both received and accepted a social-network invitation or personal-communication-network invitation from the sender of the social-network invitation or personal-communication-network invitation. The directionality or direction of a link is from the sender of the invitation to the recipient/acceptor of the invitation. Stated differently, the directionality or direction of a link is from the inviter to the invitee, and upon accepting an invitation from the invitor, the invitee becomes a member of the invitor's personal communication network or social network.

A link is a path or connection from one node to another node.

Unidirectional is a term that describes a link between a first node and a second node, wherein the first node has accepted a personal-communication-network invitation from the second node, but the second node hasn't accepted a personal-communication-network invitation from the first node. In such a case, a link has been established only based upon the first node's acceptance of an invitation from the second node.

Bi-directional is a term that describes a link between a first node and a second node, wherein the first node has accepted a personal-communication-network invitation from the second node, and the second node has accepted a personal-communication-network invitation from the first node. In such a case, a link has been established based upon two invitations and acceptances of invitations: the first node's acceptance of an invitation from the second node, and the second node's acceptance of an invitation from the first node.

A personal-communication-network link is a link in a personal-communication-network.

Reciprocal invitation is a return invitation that is sent from an original recipient or invitee back to the original sender or inviter.

An invitation-and-acceptance process is a series of events that enables a person to become a member of a social network or personal communication network.

Mapping is a term that can be used to describe the manner in which a social network or personal communication network is visually illustrated.

A real-time online network is an online network that manipulates (e.g. records, analyzes, and presents) data in real time.

BRIEF DESCRIPTION OF THE DRAWINGS

FIG. 4 is an illustrative display of an embodiment of the present invention.

FIG. 7 is an example of arrangements on search results.

DETAILED DESCRIPTION OF ILLUSTRATIVE EMBODIMENTS

Figure 1:
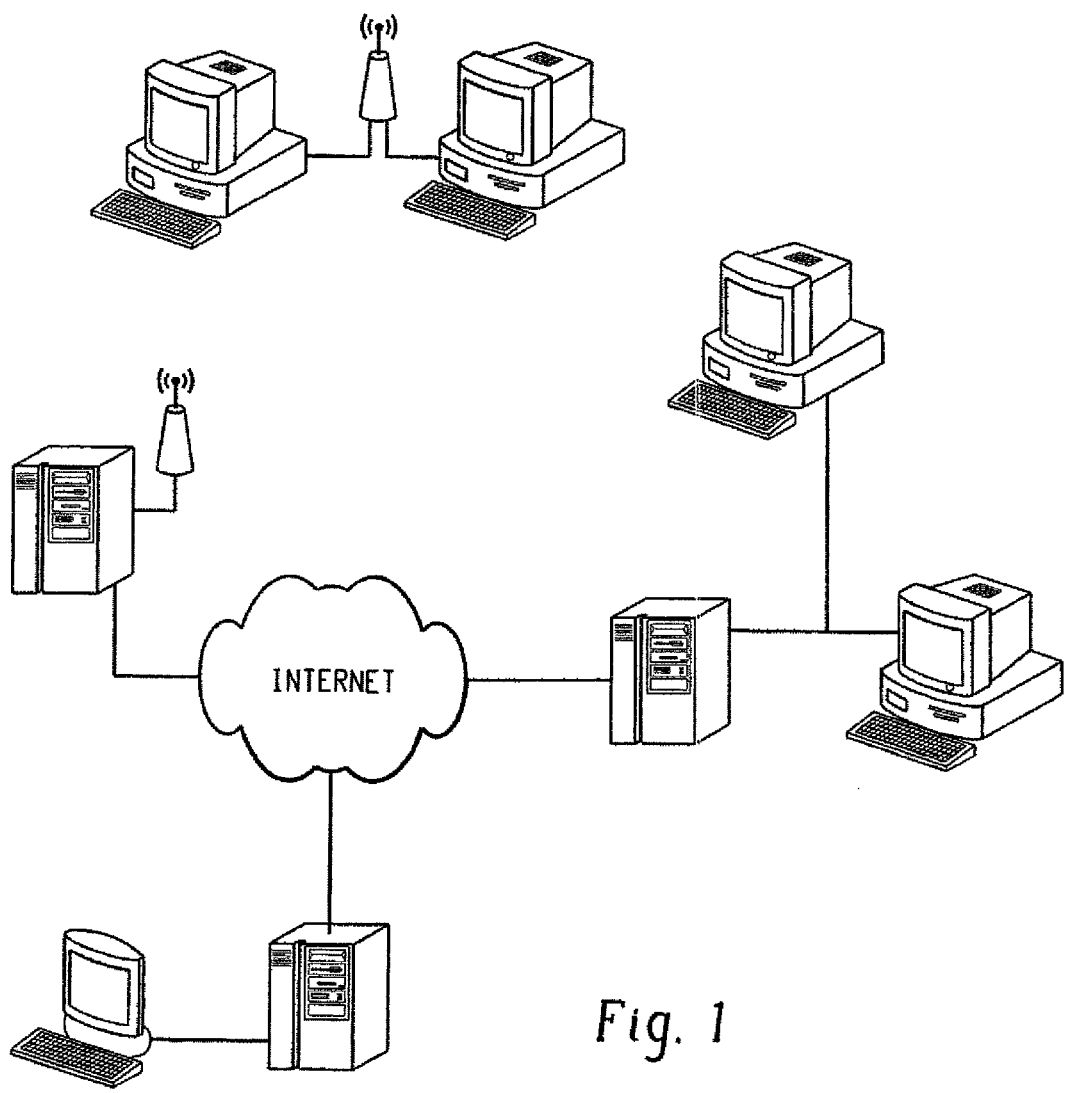
FIG. 1 is an illustrated arrangement of a network for employing the system of the present invention.
Figure 2:
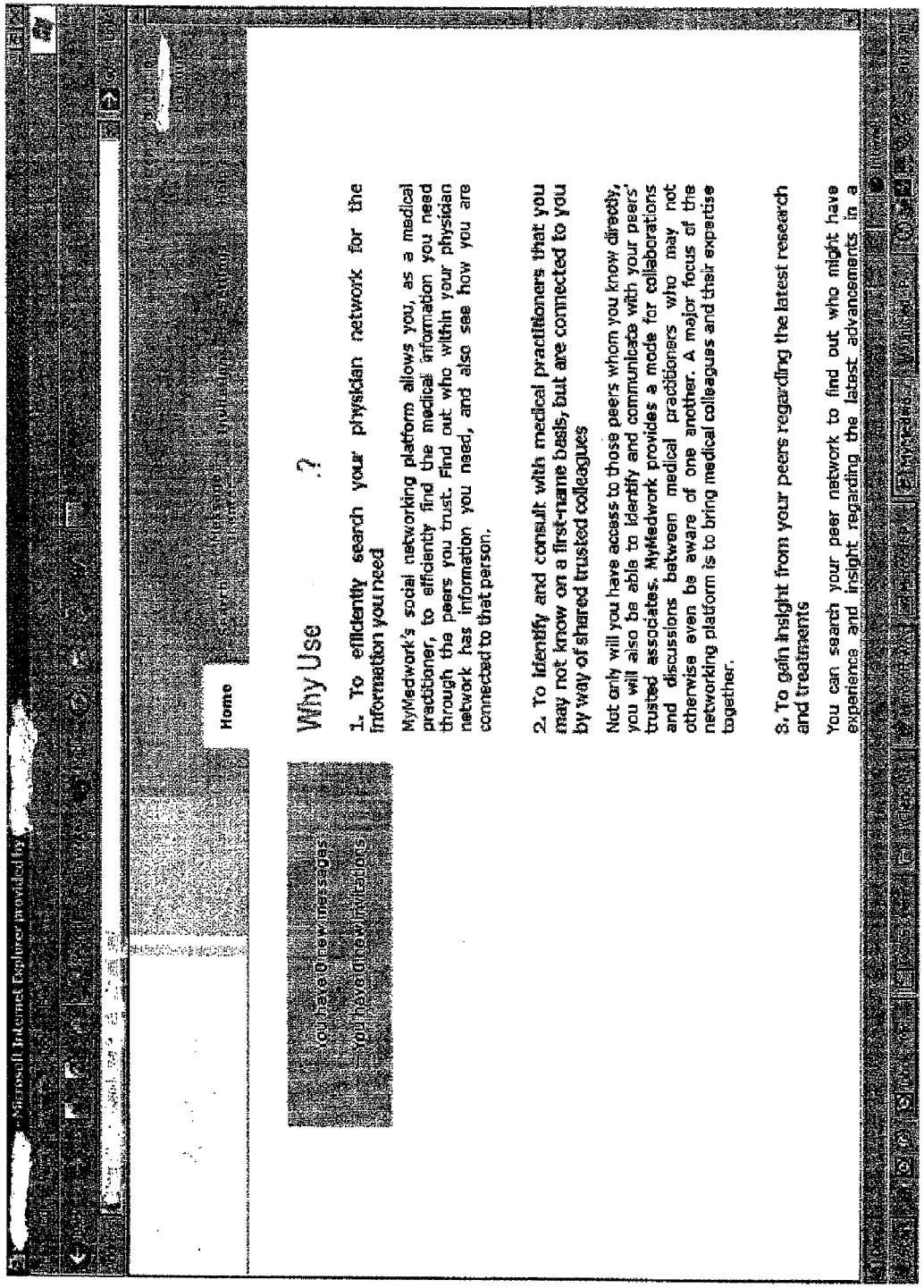
FIG. 2 is an illustrative display of an embodiment of the present invention.

This invention is generally directed to social-network analysis of a personal communication network or personal communication networks. An embodiment of the present invention provides a system for classifying at least one personal communication-network member as an opinion leader in a field of interest based at least in part on personal-communication-network data.

The term user is used below to describe a personal-communication-network member or other authorized individual who is has been invited to join a personal communication network by a personal-communication-network member and use the system of the present invention to communicate with other personal-communication-network members. A personal-communication-network member is used to describe an individual who has previously joined a personal communication network and has saved a profile of himself/herself in a computer-accessible memory that can be accessed to electronically store information to be used with the system.

An embodiment of the present invention provides a system for classifying at least one personal-communication-network member as an opinion leader in a field of interest based at least in part on personal-communication-network data. The system includes a computer-accessible memory for storing computer-readable logic that enables a central processing unit ("CPU") to identify an opinion leader within a field of interest. The CPU can be provided at the server, the computer terminal the user enters data or any other computational device. The identification of an individual as an opinion leader can be based upon data generated from the person's participation or interaction with the at least one personal communication network, such as the person's discussion of a particular topic with another member of that person's personal communication network, or merely a membership in the at least one personal communication network.

As used herein, an opinion leader is a member of a personal-communication network that has established direct communication with many other members of the network. Direct communication requires the two parties to be related by a single degree of separation. Being separated by only a single degree of separation, the opinion leader will be a primary contact of many network members. The more members of the network that have the opinion leader as a primary contact, the higher his priority, rank, or reputation, as an opinion leader in that network will be. A predetermined number of primary contacts can be determined and set as the threshold number of contacts required to be considered an opinion leader, or, opinion leaders can be selected based on the number of network members they communicate directly relative to other network members.

A single network member can be identified as the only opinion leader per network, that network member having the most established contacts separated by a single degree of separation in the particular network. Alternately, a plurality of network members can be selected as opinion leaders, the plurality of network members comprising the top x network members in terms of the number of established contacts separated by a single degree of separation in that network.

According to other embodiments of the present invention, an opinion leader or a plurality of opinion leaders can be selected based on the percent of network members that have received one or more communications from the opinion leader(s). According to yet another embodiment, an opinion leader can be selected as such based on the overall number of contacts established, regardless of the particular network in which those contacts are established, quantity and direction of invitations linking the opinion leader to other network members, initiation and outcomes of searches conducted by opinion leaders and other members of the network.

An additional embodiment provides for identifying an opinion leader using personal-communication-network data that is based upon or related to an invitation-and-acceptance process. More specifically, the personal-communication-network data that is based upon or relates to an invitation-and-acceptance process can be data relating to electronic invitations to current or new members of a personal communication network.

A further embodiment provides for identifying an opinion leader using personal-communication-network data that is based upon or related to search terms or phrases employed by a personal-communication-network member in conducting a search of personal-communication-network data.

Defined as above, an opinion leader is considered to be a network member whose opinions reach a large audience relative to the opinions of other members of that network. Typically, the opinion leader's comments have grown to be well respected in a particular field over time due at least in part to the knowledge, experience, or familiarity with the subject matter on which the opinion leader comments. This respect, in turn, motivates physicians or others seeking to gain knowledge about this subject matter to invite the opinion leader to join their personal network as a primary contact, separated by only one degree of separation. As the number of network members that list the opinion leader as a primary contact increases, so does the opinion leader's prospective audience and therefore, his ability to influence the knowledge of those audience members.

The system for classifying at least one personal-communication-network member as an opinion leader can optionally identify, or otherwise classify at least one personal-communication-network member as an opinion leader in a field of interest based upon the quantity of memberships that the at least one personal-communication-network member has in personal communication networks, wherein all of the networks have the field of interest in common. Thus, one or more opinion leaders can be identified specifically for the particular field of interest.

Computer-readable logic can optionally be provided according to an embodiment of the present invention to identify or classify a person as an opinion leader within a field of interest based upon the quantity of electronic communications that the person has sent to personal-communication-network members in the field of interest. Likewise, the one or more opinion leaders can be identified and classified according to instructions within computer-readable logic that classifies a person as an opinion leader within a field of interest based upon the quantity of electronic communications that the person has received from personal-communication-network members in the field of interest. Alternate embodiments consider a combined number of sent and received electronic communications to identify an opinion leader. Other factors, such as the direction and quantity of invitations or connections between nodes, frequency of communication between nodes, the number of words in a communication between nodes, the direction of communication between nodes, the number of key words in a communication between nodes, the search terms and results generated by the nodes, and combinations thereof, for example, can also be used in addition to, or in lieu of, any other factor mentioned above.

An alternate embodiment of the present invention provides a system for assessing a person's likelihood to use a concept or product that is new to the person. The system includes computer-readable logic for classifying a person's innovativeness based upon the quantity of personal-communication-network invitations the person has received from a personal-communication-network member.

A network member considered to be an innovator, as that term is used herein, is a network member who is more likely to adopt, or otherwise adapt his practice to include a novel technology, treatment, therapeutic agent, ideology, or other advance (collectively referred to as a "recent development")

than other network members who are not innovators. Similar to the description above for identifying an opinion leader, an innovator can be selected as the network member who is likely to be the first to adopt a recent development, or as the top y network members who are likely to be the first y people to adopt the recent development. Alternately, the innovator(s) of a particular network can be identified as the z % of network members who are likely to adopt a recent development within a predetermined timeframe. These are but a few examples of the many possible ways to identify the innovator(s) of a network, and should not be considered an exhaustive listing of all possibilities.

Any factor that tends to indicate a network member's likelihood to adopt or otherwise utilize a given recent development can be used to identify the innovator(s) of that network. Nonlimiting examples of such factors include: the time between a similar recent development's introduction to the market and a time when the network member adopted the similar recent development; the network member's participation in experimental studies; the length of time required for the person to respond to a personal-communication-network invitation; the duration a prescriptions written by network members; the number of invitations sent to a potential user/member; publications by the network member discussing efforts to develop the recent development; anticipation of the recent development; opinions expressed by opinion leader(s); or opinions by other network members respected by the network member. Any of the factors chosen to identify the innovator(s) of a network can be suitably weighted to fine tune the algorithm used to quantify the degree of innovativeness used to identify innovators.

As mentioned above, innovators can be classified based upon the number of invitations sent to a potential user/member, wherein the invitations are directed to the invitee joining a social network or more preferably, a personal communication network. Some individuals may require only one invitation to convince them to join—these are the innovators. Others may require up to ten or fifteen invitations from current users before deciding to join—these are the laggards. Innovativeness classifications can be used in marketing campaigns in which innovators can be targeted first, then early adopters, early majority, late majority, and laggards (innovators being the most innovative and laggards being the least innovative).

In one embodiment for classifying a person's innovativeness, an innovativeness classification is needed by using computer-readable logic that employs a function that is based upon personal-communication-network data in combination with a statistical diffusion curve and innovativeness classifications (as defined by diffusion researchers). In one embodiment, the statistical diffusion curve is an s-shaped curve that plots the percentage of a population that has adopted an innovation over time. In theory (and as verified by data), once the percent of population adopting an innovation hits roughly 20%, the rate of adopting rapidly increases, and then tapers off as the percent of population adopting the innovation hits about 80%.

It is common for opinion leaders to also be considered innovators because of the personality traits common amongst authoritative figures in a particular field and innovators in that same field. Accordingly, whether a network member is considered to be an opinion leader can optionally be a factor used to determine whether that network member is also an innovator.

In addition to the above, at least one embodiment of this invention provides for searching personal-communication-network data that is in the form of electronic or electronically searchable communications between personal-communication-network members. An embodiment that employs the search method provides computer-readable logic for determining or identifying the use of one or more words or phrases in a communication or communications between two personal-communication-network members. Computer-readable logic can be used to search for a string of characters within one or more databases of recorded electronic or electronically searchable communication(s) from one personal-communication-network member to another. The computer-readable logic searches the personal-communication-network communications and quantifies or qualifies the use of at least one string of characters, e.g., word or phrase, within the communications.

An additional embodiment of this invention provides for using computer-readable logic to search personal-communication-network data that is in the form of electronic or electronically searchable communications between personal-communication-network members or nodes. A use of such an embodiment can be directed to identifying a topic of discussion or common field of interest between two or more personal-communication-network members. This embodiment provides for using computer-readable logic to search one or more databases of recorded electronic or electronically searchable communication(s) between personal-communication-network communications for words or phrases associated with a search term or search phrase. The computer-readable logic identifies the words or phrases relating to a field of interest and can thereby identify a topic of discussion or field of interest in a particular communication or communications.

In an embodiment of the invention, personal-communication-network data in any known form of communication can be subject to SNA via computer-readable logic. In a further embodiment, personal-communication-network data in any known form of electronic or electronically-searchable communication can be subject to SNA via computer-readable logic. Nonlimiting examples of useful forms of known electronic or electronically-searchable communications include: electronic mail (email), chat, online chat, and discussion boards.

Further, regarding the above-mentioned communication between nodes, another embodiment uses computer-readable logic to identify and define communication contexts among personal-communication-network users. Stated differently, the embodiment identifies one or more topics of discussion within a communication between two nodes. The communication contexts will most likely be dependent upon the audience and network boundary. In an example relating to the medical domain, nonlimiting examples of communication contexts or general topics of discussion include: medicine, pediatrics, aerospace medicine, diagnosis and treatment, pharmacology, asthma, allergy and immunology, anesthesiology, colon and rectal surgery, dermatology, emergency medicine, family practice, general preventive medicine, internal medicine, critical care medicine, medical genetics, neurology, physical medicine and rehabilitation, preventive medicine, psychiatry, molecular genetic pathology, neurological surgery, diagnostic radiology, neuroradiology, nuclear medicine, obstetrics, gynecology, occupational medicine, ophthalmology, orthopaedic surgery, otolaryngology, pathology-anatomic and clinical pediatrics, plastic surgery, preventive medicine, public health, radiation oncology, radiology-diagnostic surgery, thoracic surgery, urology, abdominal radiology, addiction psychiatry, adolescent medicine, adult reconstructive orthopaedics, blood banking/transfusion medicine, cardiothoracic radiology, cardiovascular disease, chemical pathology, child neurology, clinical cardiac electrophysiology, clinical neurophysiology, clinical and laboratory immunology, craniofacial surgery, critical care medicine, cytopathology, dermatopathology, developmental-behavioral pediatrics, endovascular surgical neuroradiology, foot and ankle orthopaedics, forensic pathology, forensic psychiatry, gastroenterology, geriatric medicine, geriatric psychiatry, hand surgery, hematology, oncology, infectious disease, interventional cardiology, medical microbiology, medical toxicology, musculoskeletal oncology, musculoskeletal radiology, neonatal-perinatal medicine, nephrology, neurodevelopmental disabilities, neuropathology, neuroradiology, neurotology, nuclear radiology, oncology, orthopaedic sports medicine, orthopaedic surgery of the spine, orthopaedic trauma, pain medicine, pediatric anesthesiology, pediatric cardiology, pediatric critical care medicine, pediatric emergency medicine, pediatric emergency medicine, pediatric endocrinology, pediatric gastroenterology, pediatric hematology/oncology, pediatric infectious diseases, pediatric nephrology, pediatric orthopaedics, pediatric otolaryngology, pediatric pathology, pediatric pulmonology, pediatric radiology, pediatric rehabilitation medicine, pediatric rheumatology, pediatric sports medicine, pediatric surgery, pediatric urology, procedural dermatology, pulmonary disease, rheumatology, selective pathology, spinal cord injury, sports medicine, surgical critical care, undersea and hyperbaric medicine, vascular neurology, vascular surgery, vascular and interventional radiology, or a combination thereof.

In another embodiment for using computer-readable logic to identify and define communication contexts or general topics of discussion among personal-communication-network users, employable communication contexts can include any or all fields of interest. For example, if the network involves consumers, and a user or member wants to know what social network or personal-communication-network members are "opinion leaders" on the topic of cars (i.e. who do most consumers consult before buying a car), then one communication context should be for example "automotives." Additional nonlimiting examples of general communication contexts, topics of discussion, or fields of interest include: medicine, sports, science, performing arts, mathematics, literature, pharmaceuticals, biotechnology, health sciences, nursing, automotive, social work, dentistry, occupational therapy, physical therapy, rehabilitation counseling, gerontology, health administration, optometry, veterinary medicine, natural sciences, biology, chemistry, physics, forensic science, political science, history, anatomy, biostatistics, physiology, social sciences, philosophy, psychology, sociology, anthropology, education, research, mental health, psychotherapy, health, fitness/exercise, nutrition/diet, athletics/sports, games, hobbies, therapy, engineering, statistics, literature, politics, local government, state government, federal government, advocacy, law, law enforcement, private investigation, military science, journalism, mass communications, consulting, project management, contracting, architecture, religion, spirituality, culture, fine arts, performing arts, art history, dance and choreography, fashion design, interior design, painting, photography, filmmaking, sculpture, theatre, music, martial arts, crafts, entertainment, food, technology, information systems, electronics, business, marketing, management, accounting, economics, finance, entrepreneurship, automotive, real estate, home ownership, insurance, home furnishings, manufacturing, shipping, retail, beauty, fashion, environmental science, nature, animals, pets, botany, agriculture, security, aviation, travel or a combination thereof.

Still another embodiment provides for evaluating a relationship between two personal-communication-network members wherein computer-readable logic searches one or more databases of personal-communication-network data, including communications between the personal-communication-network members and performs one or all of the following: quantify the number of communications between the members, determine the frequency of electronic communication between the members (frequency can be described in terms of the dimension-number of communications per unit time), recording the number of words in an electronic communication between the members, recording the direction of communication between the members, recording the use of keywords in an electronic communication between the members, or a combination thereof.

The present invention further includes a "social search engine" that allows social-network or personal-communication-network members to search within their networks for other personal communication members or nodes that have access to information that they are seeking. The search component of the embodiment includes computer-readable logic that performs the function of a filtering mechanism, whereby a network member performing a search can use the social search engine's computer-readable logic to search her social network or personal communication network for members that have or are likely to have information of the searched subject. In a further embodiment, all of the search-string information input by a member conducting a search is stored in a searchable database and thereby adds to the personal-communication-network data generated by the member. This may be helpful because it may be beneficial to know what search terms or phrases are most often used by that or other network members.

In one embodiment for searching personal-communication-network data, the search can be directed to a field of interest or characteristics of personal-communication-network members. The search can be as general as "automotives," or as specific as "females between the ages of 12 and 14." A nonlimiting list of other potentially searchable topics include: behaviors, needs, desires, trends, and norms.

This invention also provides for using computer-readable logic that searches personal-communication-network data for multiple terms or phrases by initiating the search with a single search term. In other words, an embodiment is directed to using a single term or phrase to initiate a multi-term search of personal-communication-network data. Computer-readable logic initiates a multi-term search of the personal-communication-network data by first identifying one or more terms or phrases that will be searched in addition to the single search term or phrase that was entered by a user. The computer-readable logic does this by associating the single search term or phrase with a predetermined set of additional search terms or search phrases that have been preselected to be search in addition to the single search term or phrase. The computer-readable logic then applies both the single search term or phrase and the predetermined set of additional search terms or search phrases in a search of one or more databases of personal-communication-network data.

Additionally, if a search term or search phrase used in a personal-communication-network data search does not literally match any terms or phrases in the personal-communication-network data, the present invention has provided computer-readable logic for matching specific conditions, treatments, pharmaceutical drugs, and medical specialties to selected search terms and phrases. Therefore, computer-readable logic will search for at least one predetermined search term or phase that has been associated with the initial search term or phrase. And although there may be no literal match to the initial search term, meaningful search results can still be generated based upon the social search engine's computer-readable logic searching for additional related terms or phrases.

An embodiment of the invention also provides for a method directed to establishing a social-network or personal-communication-network link between two people. The invitation-and-acceptance method is directed to sending a social-network or personal-communication-network invitation from a personal-communication-network member, i.e. an inviter, to an invitee. An embodiment of the invitation is directed to making the invitee a member of the inviter's social network or personal communication network. The invitation is not limited to any particular form, but in an embodiment, the invitation is an electronic invitation such as an email. The invitation embodiment has the inviter describe a common field (or fields) of interest between the inviter and invitee. Stated differently, the inviter indicates at least one subject or field of interest that the inviter would like to communicate about with the invitee.

In a further embodiment of the invitation-and-acceptance method, the invitee is provided with an opportunity to send a reciprocal invitation to the original inviter, wherein the original inviter is invited into the invitee's social network or personal communication network.

Another embodiment of the invitation-and-acceptance method also provides for defining the directionality of a link between nodes in a personal-communication-network based upon an indication of whether an original inviter wants to be a member of an original invitee's personal communication network. A social-network or personal-communication-network invitation method generally involves sending a social network or personal-communication-network invitation from one person to another person, i.e., from and inviter to an invitee. And generally, if the invitee accepts the invitation, then the invitee becomes a member of the inviter's social or personal communication network, and thus a unidirectional link is established—from the inviter to the invitee.

An embodiment of this invention provides for automatically providing the person that is sending a social network or personal-communication-network invitation with an option to accept a reciprocal invitation from the invitee, should the invitee choose to send a reciprocal invitation. In other words, an original inviter is provided with a means to accept in advance a reciprocal invitation from the invitee, if the invitee should decide to send a reciprocal invitation.

To promote meaningful links between people having a common field of interest, an embodiment of the invention provides for a system that helps personal-communication-network members construct meaningful trust networks by providing explicit instructions for an invitation-and-acceptance process used to construct a personal communication network. The system uses computer-readable logic to provide a user with conditions for inviting a person into the user's personal communication network. As a nonlimiting example of instructions relating to a personal communication network directed to the medical field, the instructions might read, "Who to invite: Invite colleagues whose opinions you value and often solicit when making medical decisions or considering alternative treatments. This network should include physicians you trust to provide reliable information or advice regarding medical treatments, practices, and advances for the professional services you provide. If you highly value the opinions, judgments, advice, or interpretations of a physician, you should invite them into your trust network. What you can learn: Information is only as good as the source that delivers it. Building this network can help you manage your current contacts—the physicians you trust and know directly—as well as help you identify the trusted sources of your trusted colleagues. Expand your opinion network to obtain volumes of valued opinions and reliable information from your colleagues, colleagues' colleagues, or colleagues' colleagues' colleagues." The system has computer-readable logic that will enable the invitation-and-acceptance instructions to be provided to an inviter that is sending an invitation. These instructions help to ensure that data obtained through personal-communication-network links are meaningful. As a result, a user can be certain that physicians in his personal-communication-network trust each other for valued opinions and advice.

In an embodiment of the invitation-and-acceptance method, a personal-communication-network member (original inviter) sends an invitation, which can be an electronic invitation, to an individual (original invitee). The individual may or may not be a member of a personal communication network, and the invitation invites the invitee into the inviter's personal communication network. In composing an invitation contemplated by this invention, the original inviter must indicate in advance whether, should the inviter receive a reciprocal invitation into the invitee's trust network, the member would accept or decline such an invitation.

The system has computer-readable logic for determining whether an invitee is a current member of a personal communication network; if yes, then in one embodiment an invitation is sent to the invitee's system email address. A system email address is an email address provided by the system to a personal-communication-network member. If the invitee is not a personal-communication-network member, then the invitation is sent to an email address external to the system. Once the invitee reads the email, she must decide whether to accept or decline the invitation. Should she choose to accept, she must indicate whether she wishes to send a reciprocal invitation to the original inviter. If she chooses to send a reciprocal invitation to the original inviter, the system has computer-readable logic that checks for the original inviter's advance indication for either accepting or declining a reciprocal invitation.

In an embodiment of the invention, if an original inviter has indicated in advance that they would accept a reciprocal invitation from an original invitee, and the original invitee has both accepted the original invitation and sent a reciprocal invitation, then the computer-readable logic establishes a bi-directional link. If an original inviter has indicated in advance that they would accept a reciprocal invitation from an original invitee, but the original invitee has only accepted the original invitation and chosen not to send a reciprocal invitation, then the computer-readable logic establishes a unidirectional link from the original inviter to the original invitee. If an original inviter has indicated that they would not accept a reciprocal invitation from an original invite; and the original invitee accepts the original invitation, then the computer-readable logic establishes a unidirectional link from the original inviter to the original invitee.

The invitation-and-acceptance process affords several opportunities for collecting and storing directional information and confirmation, and such information has implications for searches performed by the members via the site. As a nonlimiting example, if a receiving physician (e.g. Dr. Smith) accepts and invitation from an inviter physician (e.g. Dr. Jones), then the system stores this link as one from Dr. Jones to Dr. Smith. Furthermore, Dr. Smith becomes a member of Dr. Jones' trust network, and Dr. Jones obtains access to Dr. Smith's personal-communication-network data and to the members of Dr. Smith's personal communication network. Likewise, if the receiving physician (Dr. Smith) reciprocates the invitation and the sending physician (Dr. Jones) accepts, then the system stores a second link from Dr. Smith to Dr. Jones, indicating that Dr. Jones is a part of Dr. Smith's trust network as well. Further, Dr. Jones becomes a member of Dr. Smith's trust network, and Dr. Smith obtains access to Dr. Jones' personal-communication-network data and to the members of Dr. Jones' personal communication network.

In the event that a physician declines an invitation, a link is not established, and—although the system stores all invitations and decisions—trust networks usually reflect the convention that a receiving physician that accepts an invitation becomes a part of a sending physician's trust network.

Physicians may have several different sources of advice and information, which they may or may not approach based upon the topic at hand. Such topics may include diagnostic information, treatment recommendations, pharmaceuticals, legal or ethical advice, and the like. Physicians who are respected advisors in terms of diagnoses may not be the best physician to question regarding the latest technological innovations. Therefore, the present invention requires physicians to indicate the topic(s) about which they consult the physician they wish to invite. An embodiment of the present invention implements this idea by way of the nonlimiting example:

Individual to Invite:
First Name: Last Name:
Type of Practitioner (MD, DO): Email Address:
I consult this physician regarding the following: (check all that apply)

| | |
|---|---|
| ___ Pharmacological | ___ Practice Management |
| ___ Diagnostic | ___ Technology |
| ___ Policy | ___ Procedure |
| ___ Ethics | ___ Research |
| ___ Legal | |

The consultation topics checked may also be used as a measurement of trust. For example, if Dr. Gardner indicates that she consults Dr. Harris regarding two topics, but she consults Dr. Johnson regarding five, then it can be inferred that Dr. Gardner trusts Dr. Johnson more than Dr. Harris. More importantly, encouraging physicians to indicate the context of their communication with each physician provides a rich and useful database.

A further embodiment of the invention is directed to the manner in which social-search-engine search results are presented. In other words, the further embodiment is directed to presenting: 1) personal-communication-network members identified by the personal-communication-network data search; and 2) how the members are linked to the personal-communication-network member performing the search. In an embodiment, the search results are presented in a manner wherein at least one personal-communication-network member is named in a search result, and at least one network path is presented that displays a link or series of links that show how the personal-communication-network member performing the search is linked to the at least one personal-communication-network member identified by the search. The network path can be a visual depiction of a path from one member to another member; links between nodes are conventionally illustrated by strait lines, and nodes are conventionally illustrated by dots or circles.

Still another embodiment of the invention is directed to the manner in which social-search-engine search results are presented. More specifically, the embodiment presents: 1) personal-communication-network communications identified by the personal-communication-network data search; and 2) how the personal-communication-network members that generated the communications are linked to the personal-communication-network member performing the search. In other words, the presentation of the social-search engine results displays the both the communications and their source in a visual manner. As mentioned above, the visual manner of presentation is a depiction of a path from one member to another member; links between nodes are conventionally illustrated by strait lines, and nodes are conventionally illustrated by dots or circles.

The present invention will allow personal-communication-network members to analyze personal-communication-network data to obtain search results such as: degrees (the number of direct connections or first-degree contacts a personal-communication-network member has), betweenness (represents a bridge between two cliques or clusters in a person communication network), closeness (a measurement of how close a person is to everyone else in the network), boundary spanners (have access to ideas and information flowing in other clusters—innovators), peripheral players (often connected to networks that are not currently mapped), structural equivalence (determine which people play similar roles in the network), cluster analysis (find cliques and other densely connected clusters), structural holes (find areas of no connection between people that could be used for advantage or opportunity), and Ed Ratio (find which groups in the network are open or closed to other). Personal-communication-network members may also find other statistics useful that are particular to their field of interest. As a nonlimiting example, the present invention provides analyses of the percentage of a physician's personal-communication-network using a particular treatment and "distance to X," which allows the physician to determine the shortest path to a target member in the physician's personal communication network.

An embodiment of the invention searches personal-communication-network data using computer-readable logic that employs mathematical algorithms to determine the order of presentation of search results. Such algorithms take into account keywords entered into each personal-communication-network member's profile, field(s) of interest, the likelihood that the target member is the best person to answer the question (based upon personal-communication-network data specific to the target member), degrees of separation from the member conducting the search (degrees or links away), similarity to the searching member (based upon attributes listed in the profiles), physical proximity, and other personal-communication-network data (such as personal-communication-network communications).

Moreover, the search results present the path between personal-communication-network members, e.g., from the personal-communication-network member entering the search terms to the personal-communication-network members identified by the search, which includes all members in the shortest number of links. Therefore, the member performing the search learns who has the information they seek, the personal-communication-network profile of a member or members revealed by the search, and how the members revealed by the search are connected to the member conducting the search.

In an embodiment, social engine search results are presented in an innovative, clear, and tabular manner. The social search engine presents results by clearly denoting who in a member's personal-communication-network has the information being sought and how the searcher is connected to the members revealed by the search. In an embodiment, the columns represent degrees or links between the searching member and the network members revealed by the search. In yet another embodiment, the rows illustrate the relational paths from the searching member to the member(s) revealed by the search. In a further embodiment, highlighted names indicate a personal-communication-network member having the information sought. In another embodiment, the searching member's personal-communication-network profile is shown on the left panel of the results table, and the profile of a personal-communication-network member revealed by the search can be viewed in the right panel by clicking his or her name.

Should the attributes of the personal-communication-network members be of interest, then a personal profile page may be added to the system. In this case, members can input various information about themselves (e.g. fields of interest).

A further embodiment of the invention provides a personal-communication-network member with the ability to organize personal-communication-network communications by providing and electronic means for archiving personal-communication-network communications into a personal-communication-network database. The database in turn is searchable by personal-communication-network members, wherein the member performing the archiving designates a searchable term to be associated with the personal-communication-network archive or communication. Upon associating the search term with the personal-communication-network archive or communication, a keyword search of personal-communication-network data that uses the searchable term will return a search result that identifies the personal-communication-network archive or communication.

A further embodiment of the invention provides for computer-readable logic that organizes personal-communication-network invitations to email address provided by the invention. In an embodiment, computer-readable logic identifies whether an invitee of a personal-communication-network invitation is a personal-communication-network member. And if the invitee is a personal-communication-network member, then the computer-readable logic directs an invitation to a personal-communication-network electronic mailbox (e-mailbox) provided by the invention. Stated differently, if an invitee is a personal-communication-network member and receives an invitation from another personal-communication-network member, then that invitation is automatically directed or redirected by the computer-readable logic to an e-mailbox provided by the inventive embodiment.

In an embodiment, the invention does not overwrite personal-communication-network data so as to monitor/record changes in the personal-communication-network data over time. Changes to the network data are preferably stored as new entries in a database, so all entries and revisions are saved in the database, and this database is accessible for personal-communication-network data analyses and the like. Methods of storing electronic data via computers, software, databases, servers, and the like are known and relatively common. In an embodiment of this invention, relational databases that are connected to multiple servers or server farms can be employed to store personal-communication-network data.

In an embodiment, the present invention allows for the collection of real-time data. Because an embodiment of the invention provides a system having a server database that stores all information as new—and does not overwrite outdated data—changes in personal communication networks will be stored and traceable so that the dynamic and flexible personal-communication-network data can be analyzed for changes over time. As an example, such changes may include additional links as physicians invite new physicians, forge new friendships, link to physicians they meet via a website, at conferences, or new contacts when they move. Moreover, the database will reflect the deletion or removal of ties when physicians indicate that a relationship or link no longer exists (for reasons such as moves, death, a "falling-out," etc.).

In an embodiment, personal information (or network-profile information) can be verified before a person becomes a personal-communication-network member. For example, if the target members of a personal communication network are an exclusive group (i.e. physicians, attorneys, college students, etc.), then the invention may require a verification process, wherein a person's information is verified before the person can become a personal-communication-network member. This will not only put the users at ease, but will also ensure the integrity of the collected data. For example, if the social network of attorneys is desired, it is important to ensure that only the network of attorneys is captured, and not the relationships between attorneys, their clients, and their secretaries, etc.

Another embodiment of the invention provides a server with computer-readable logic for mapping personal-communication-network paths or links with specificity. In an embodiment, the invention maps two or more personal-communication-network paths or links. In another embodiment, the invention maps three or more personal-communication-network paths or links. In another embodiment, the invention maps four or more personal-communication-network paths or links. In yet another embodiment, the invention maps five or more personal-communication-network paths or links. In still another embodiment, the invention maps a plurality of personal-communication-network paths or links. Pragmatically, personal-communication-network members may want to know all paths that lead from them to a target member for various reasons. Perhaps they have recently spoken to the member who serves as the link in one path, or they prefer to utilize a particular member as a link over another for prestige, or one member is on vacation and therefore cannot serve as a liaison. Whatever the reason behind the desire to see multiple paths, the present invention recognizes and satisfies this desire. Sometimes one direct route is all that is needed, but it may be preferable to have options.

In addition to being invited into a personal communication network, a user can elect to register as the start (or seed) of a new personal communication network that will initially only include that user. In an embodiment, before a user is permitted to register as a new personal-communication-network member, a verification process can optionally be conducted to ensure that the user attempting to register is actually interested or involved in a field of interest. For example, a physician may be verified to be board-certified and duly authorized to practice medicine. According to this physician example, to initiate a new personal communication network, and therefore become a physician within a personal communication network, the user can enter an appropriate URL into an address line of a web-browser displayed by a remote computer terminal in a known manner. Upon accessing the system for the first time, computer-readable logic causes a new-user-registration option to be displayed to the user. To minimize the number of unauthorized users that can use the system for unscrupulous purposes, users must register by creating a profile of themselves before they are able to login in and conduct a search or take advantage of other features of the system. The information entered by the user can be used to confirm the user's status as a licensed physician or other authorized user of the system. Returning users that have already completed their profile can skip the new-user registration step by electing to log in instead. Use of the system following a log-in procedure or after receiving an invitation to join is described in detail below.

In use, an embodiment of the system of the present invention can be accessed by a user by entering an appropriate URL into an address line of a web-browser displayed by a remote computer terminal in a known manner. Upon being invited to join a personal communication network by a personal-communication-network member, a user receives an email with a hyperlink to permit the user to access the system for the first time. Executing the hyperlink causes the display of a new-user-registration interface generated by computer-readable logic. To minimize the number of unauthorized users that can use the system for unscrupulous purposes, even invited users must register by creating a profile of themselves before they are able to login and conduct a search or take advantage of other features of the system. Returning users that have already completed their profile can skip the new-user registration step by electing to log in instead.

Figure 3:
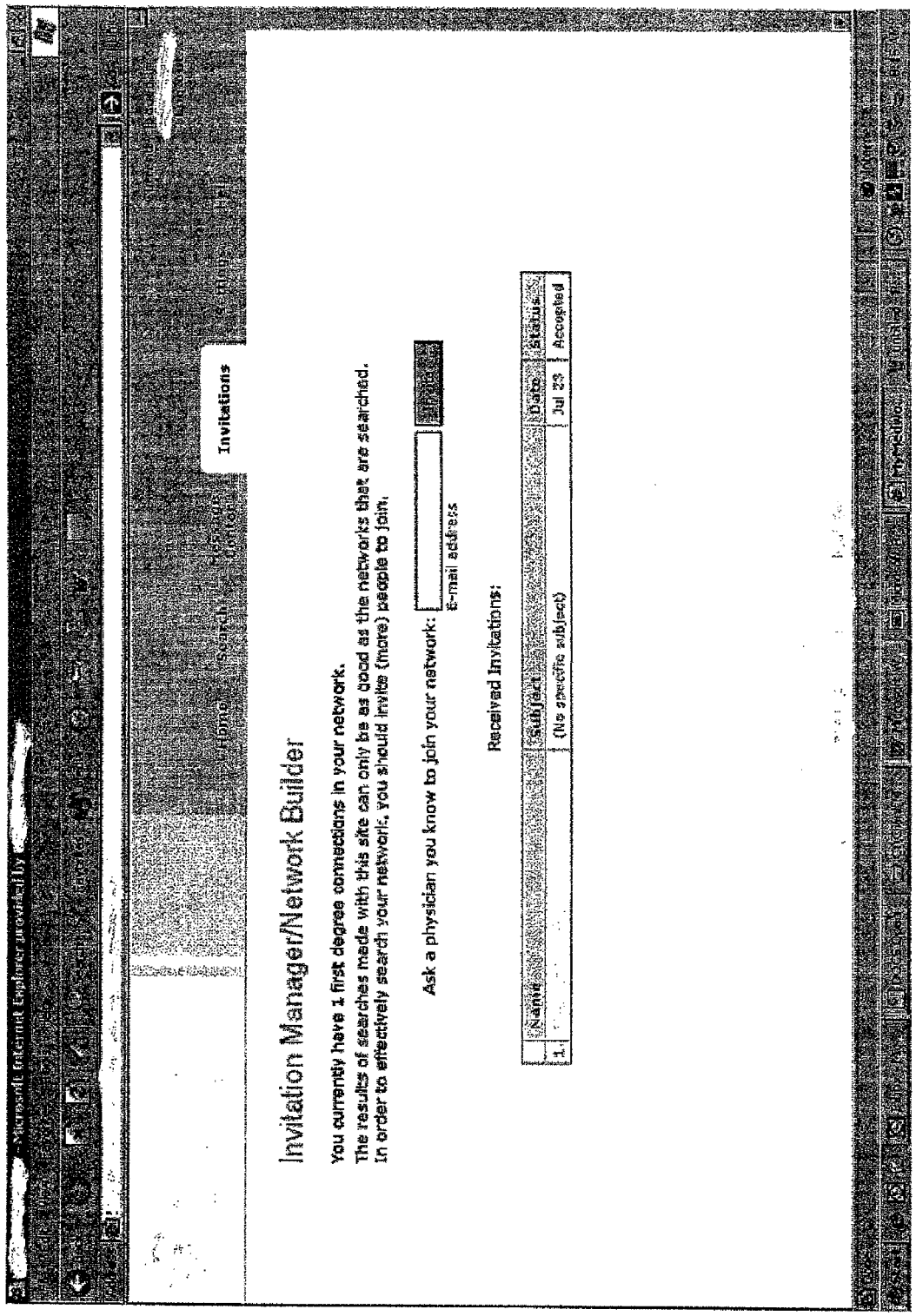
FIG. 3 is an illustrative display of an embodiment of the present invention.

After the invited user has created a profile and logged in, computer-readable instructions cause a home page to be displayed so the user can select from a plurality of options presented as tabs located along an upper portion of the home page. Examples of the options available to logged-in users as shown in FIG. 3 include Home, Search, Message Center, Invitations, Settings, and Help. FIG. 3 is merely an example of the system options that can be provided, but the system of the present invention must offer at least the Search option.

Once a user has generated his/her profile, the user can extend invitations to other registered personal-communication-network members to join the user's personal communication network, and use the Search option to locate personal-communication-network members already in the user's personal communication network and commence communications with those personal-communication-network members that satisfy the user-defined search criteria.

Extending an invitation to join the user's personal communication network can be accomplished by selecting the Invitations tab, which causes an Invitation screen generated by computer-readable logic to be displayed by the monitor as shown in FIG. 3. An invitation to join a personal communication network by selecting the Invitations tab can be sent by entering an email address, contact name, or other information identifying the person or user to be invited into an invitation field. Selecting an Invite button causes the system to convey an invitation via email or other electronic communication to join the user's personal communication network to the invitee who is identified in the invitation field.

For the embodiment shown in FIG. 3, the email address is entered in the invitation field and the Invite button selected. As an example, to illustrate the present invention, the fictitious name and email address of Dr. Steve Johnson at Fake Hospital is used. The detailed display of FIG. 4 generated according to the instructions in the computer-readable logic allows the user to specify the context in which the user will consult with the other physician to be invited into the user's personal communication network. For example, the detailed-invitation screen shown in FIG. 4 allows the user to select one or more of the following consultation contexts: Diagnostic, Treatment, Pharmacological, Research, Education, and Practice Management. Any number of these contexts can be eliminated, replaced with other contexts not specifically recited herein, or supplemented by other contexts without departing from the scope of the present invention.

Figure 4:
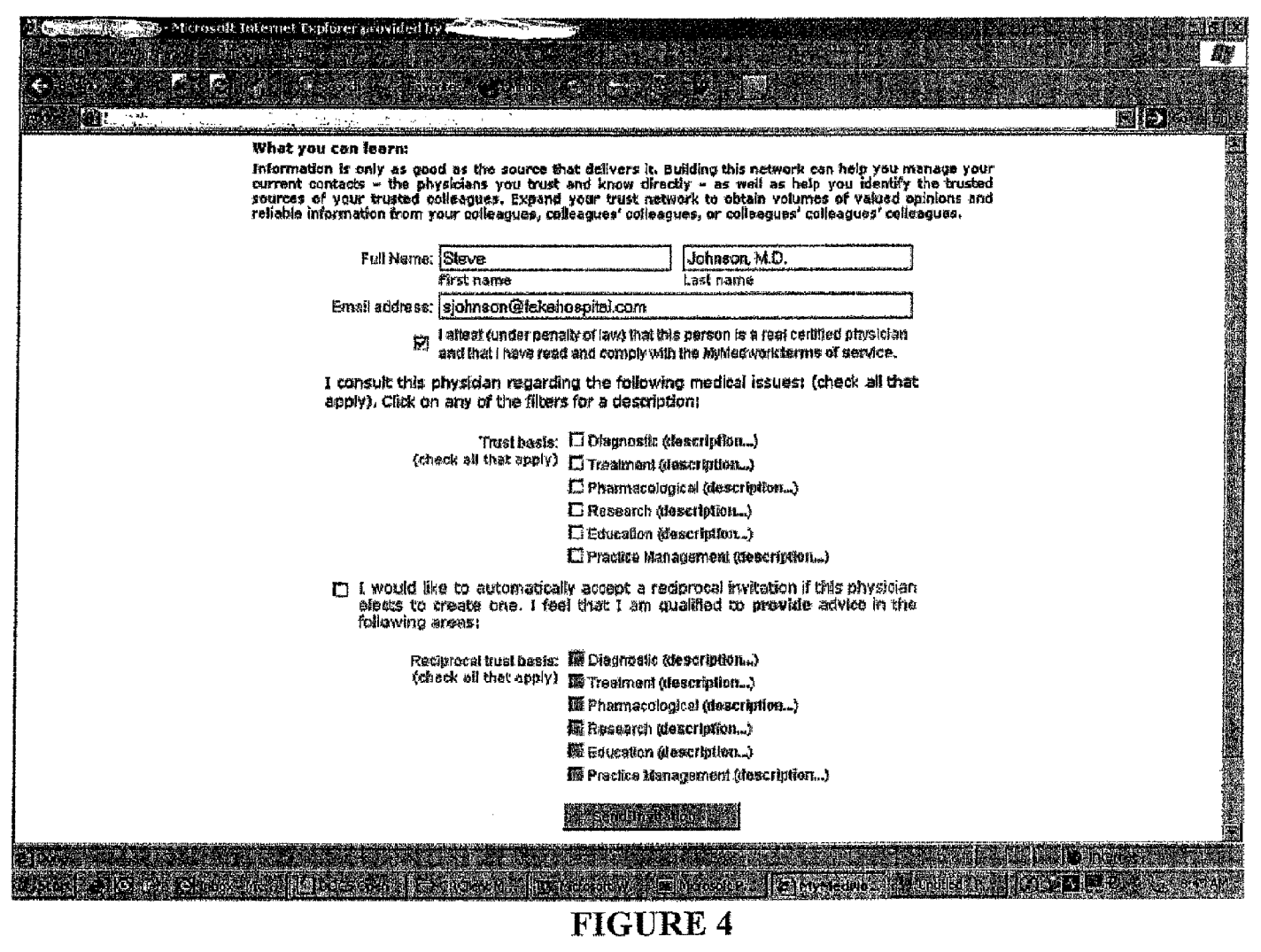

To assist the user in selecting a proper context for consultation, the user can view a description of each context by selecting such an option with an electronic pointing device such as a conventional mouse or trackball. In FIG. 4, the (description) option positioned adjacent to the context for which additional information is sought can be selected to view the additional information.

When the user is specifying the context in which he/she will consult with the person or user to be invited, the user can also select whether a reciprocal invitation will automatically be accepted, should the invited person or user elect to send one. A selection whether to accept any reciprocal invitation can be made by choosing the check box, or by any other suitable indicia of the user's desire to automatically accept any reciprocal invitation to join the personal-communication network of the invited person or user. And just as before, the user can specify the areas in which the user feels comfortable rendering advice or generally communicating.

Sending an invitation to an invitee to join a user's personal communication network, and the entire network in general, is an attempt to include that invitee in the personal communication network of the user in the one or more contexts specified by the user. The invitee will be the recipient of an email, or other electronically-originated communication informing the invitee of the existence of the invitation. Other embodiments of the present invention include computer-readable logic that generates a visual notice, audible notice, or a combined visual and audible notice to alert the invitee to the existence of the invitation when the invitee logs onto the system. As shown in FIG. 3, an invitation table of received invitations is generated according to instructions contained in computer-readable logic of the present invention to list recent invitations, a subject, date of invitation, and status of the invitation. Status symbols such as Accepted, Rejected, Accepted and Reciprocated, Pending, and others can be used to indicate the status of an invitation. Other fields can be included in the invitation table, such as the user-selected context, and the like. Further, computer-readable logic can also be included in the present invention to generate a sent-invitation table to tabulate recent invitations extended by the user, and the status of those invitations.

Figure 5:
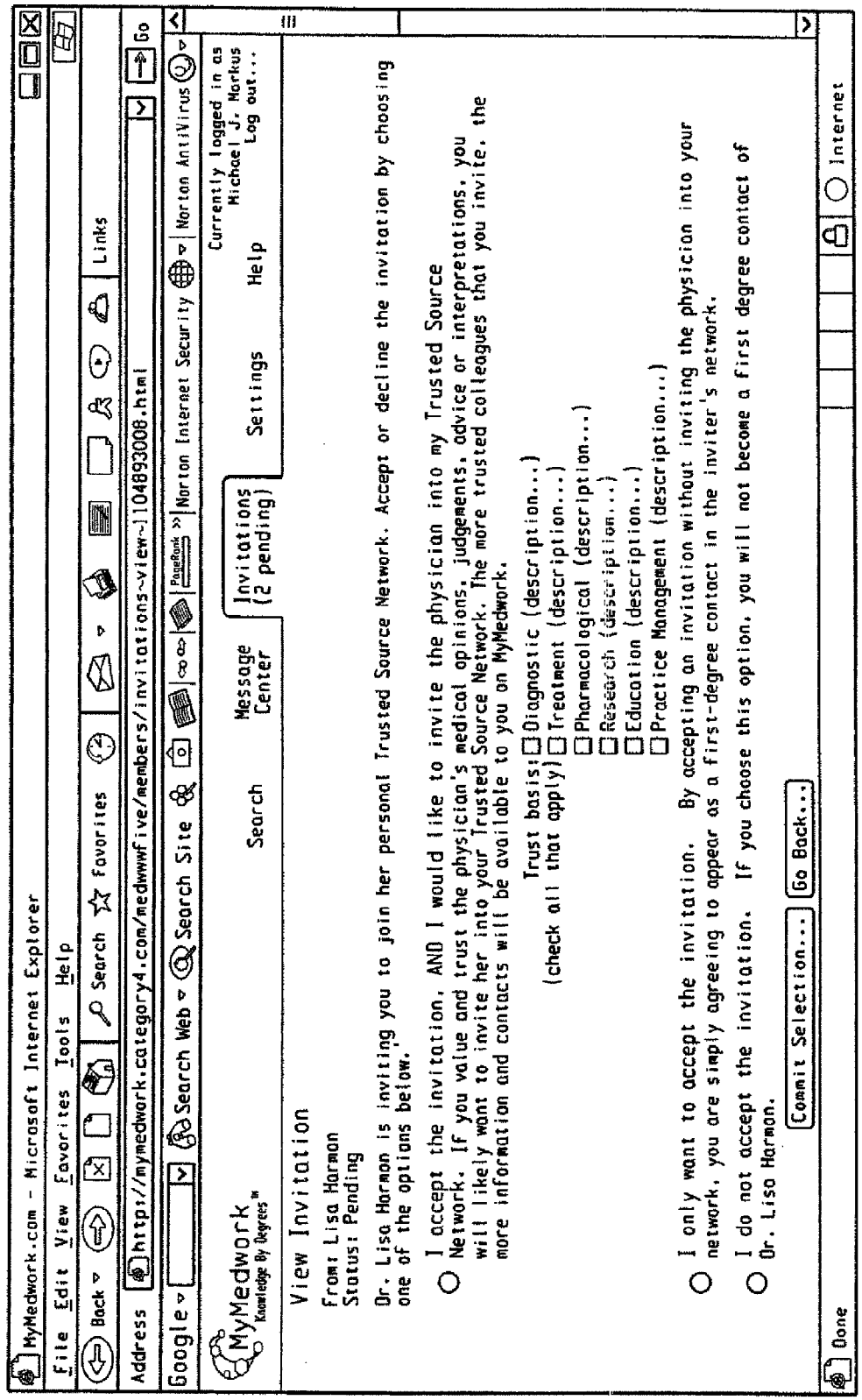
FIG. 5 is an illustrative display of an embodiment of the present invention.

Upon receiving notice of the invitation's existence via email, for example, computer-readable logic included as part of the system presents the invitee with a hyperlink to a response page, where the invitee is presented with a plurality of optional responses as shown in FIG. 5. In the embodiment shown in FIG. 5, the invitee can accept and send a reciprocal invitation, accept without sending a reciprocal invitation, and decline the invitation to join the user's personal communication network.

If the invitee accepts the invitation, a direct communication link is established between the user and the invite, meaning that the invitee has joined the user's personal communication network, and that the invitee is now a first-degree contact or is separated from the user by only one degree of separation. The user's first-degree contacts are stored electronically in a computer accessible memory provided to a server, for example. Additionally, the invitee has become a member of the user's personal communication network and is thereby linked to all of the nodes in the user's personal communication network. It will be appreciated that the nodes in the user's personal communication network will be two or more degrees of separation away from the invitee once the invitee has accepted an invitation from the user. As a member of the user's personal communication network, the invitee can search or establish communications with other members of the user's personal communication network via the invitee's link through the user.

The fact that the invitee has accepted the invitation to become a first-degree contact of the user does not necessarily mean that the user has become a first-degree contact of the invitee. Whether the user becomes a first-degree contact of the invitee is a consequence of the direction of the communication link. For example, in the scenario where the invitee accepts the user's original invitation and declines to offer a reciprocal invitation to the user, the communication link is said to be unidirectional from the user to the invitee. In this case, the invitee is a first-degree contact of the user, but the user is not a first-degree contact of the invitee.

If the user sent an invitation to the invitee, the invitee accepted the invitation and extended a reciprocal invitation to the user, the user can accept the reciprocal invitation in much the same way as the invitee has to become a first-degree contact of the user. The user's acceptance can be automatic if the user selected the automatic acceptance option shown in FIG. 4, or the user can manually accept such a reciprocal invitation. In this scenario, the communication link between the user and the invitee is a bidirectional communication link, meaning that the user and the invitee are first-degree contacts of each other and consult with each other in the specified contexts.

Finally, the invitee can decline the invitation from the user, thereby not becoming a first-degree contact of the user. If this occurs, computer-readable logic will generate and send a response indicating the invitee's desire to decline the invitation. The invitee's response can optionally include a personal statement issued by the invitee indicating his/her reasons for declining the invitation.

The process of inviting and receiving invitations from others to bring persons or users into the systems entire inventory of personal communication networks (the entire inventory being described as a global network) and establish first-degree contacts is a continuous process. As a nonlimiting example, invitations to join a personal-communication network will typically be extended to registered physicians as those extending the invitations encounter medical-related issues with which the invited physicians have experience. Once a physician has accepted an invitation to join a personal communication network, the physician can search for members of that personal communication network to engage with respect to a particular matter, as well as for members of other personal communication networks that are linked by a chain of communication.

A chain of communication is a communication path that has an uninterrupted path from one node to another in a user-specified context. As shown in FIG. 3, example (I) is a chain of communication between Node A and Node C that includes Node B therebetween. This means that Node A can establish communication with Node C using Node B as an introduction, or by merely explaining to Node C that Node A is a contact of Node B. And Node A can form a preliminary opinion about Node C based on what Node A already knows about Node B. If Node B is a very astute individual that exercises great discretion in establishing first degree contacts, Node A can assume that Node C is a reasonably-reliable contact.

Further, example (II) is a four-node chain of communication that includes Nodes A, B, C and D. Node A can establish communication with Node D through Nodes B and C. This does not require Node A to communicate first with Node B, followed by Node B communicating with Node C, and finally Node C communicating with Node D. Instead, Node A can communicate directly with any node, including Node D, in an attempt to establish a dialogue with Node D. As mentioned above, Node A can get an idea of the character of Node C by examining the nodes that stand between Node A and Node D.

Referring again to example (II), Nodes B, C and D are all considered to be in the personal communication network of Node A. Generally, each of Nodes A, B, C and D are considered to be in each other's personal communication network. In fact, any node that a user can establish communications with via an uninterrupted chain of communication is considered to be in the personal communication network of the base node. Note that for a node to be considered within the personal communication network of the user, communications can be established with any number of degrees separating the node from the user. However, the user can elect to display only those possible contacts that are within a predetermined degree of separation from the user. Other criteria can also be used to limit the number of nodes that are displayed in response to a search using the system of the present invention.

In one embodiment, each time a first-degree contact is added to the user's contact list, this increases the user's status as an opinion leader. The system includes computer-readable logic that identifies one or more opinion leaders based on at least the number of first-degree contacts each user has. Additionally, the computer-readable language can identify one or more opinion leaders within a specific subset of the entire network. For instance, the system of the present invention can identify one or more opinion leaders in the field of pharmacology, or one or more opinion leaders in the field of medical education, or one or more opinion leaders in a geographic area, and so on.

The system can optionally generate a listing of the one or more opinion leaders and cause the listing of opinion leaders to be displayed by the computer terminal with which the user accessed the system of the present invention. Computer-readable logic can include instructions controlling the identification and display of the opinion leaders.

The system of the present invention can optionally include computer-readable logic for identifying one or more innovators. Any number of factors such as those recited above can be considered and assigned a value to be evaluated by an algorithm included in the computer-readable logic.

Figure 6:
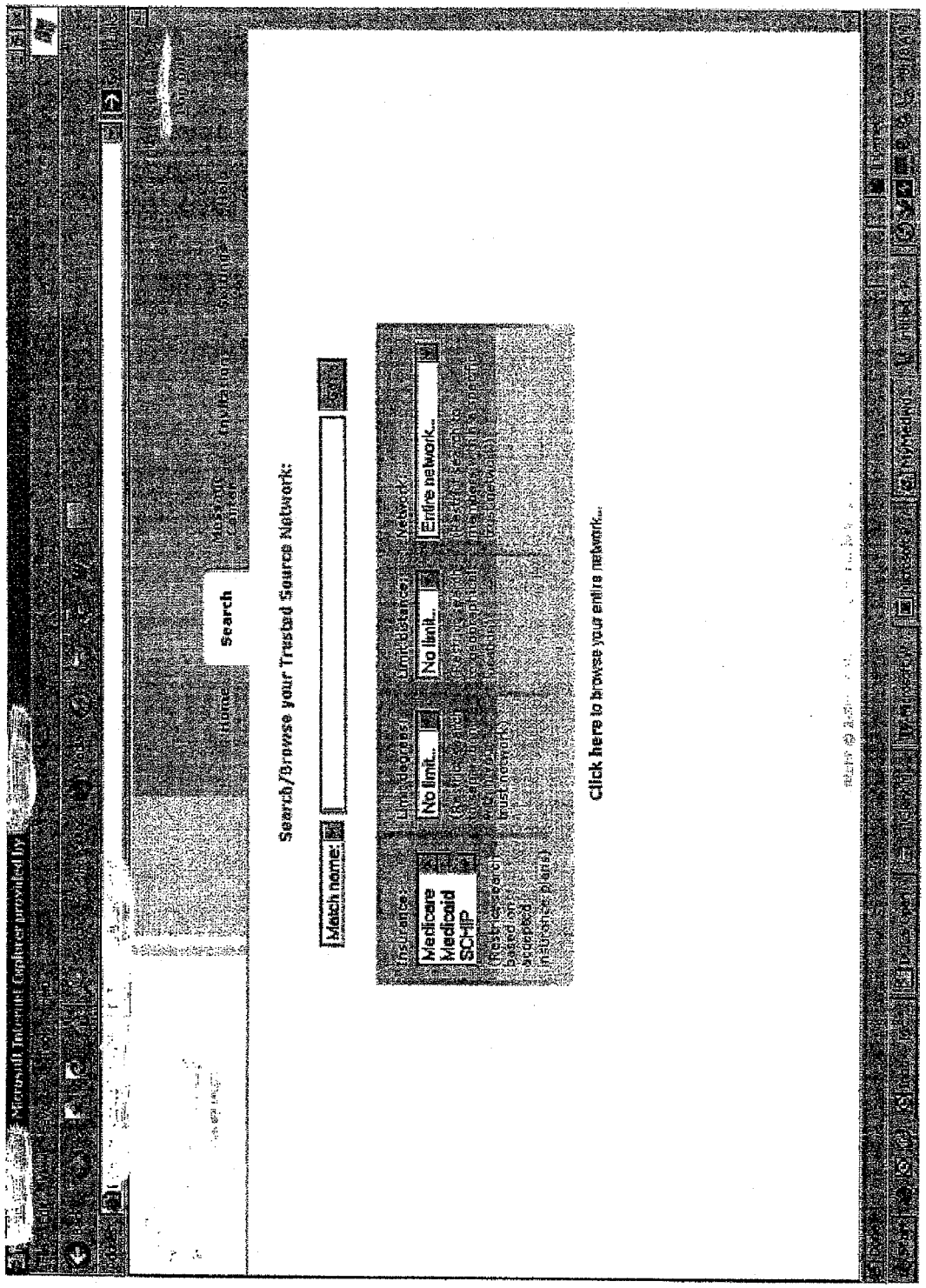
FIG. 6 is an illustrative display of an embodiment of the present invention.
Figure 8:
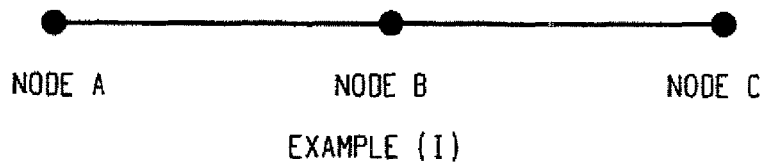
FIG. 8 is an illustrative relationship between members of a personal-communication-network.
Figure 8:
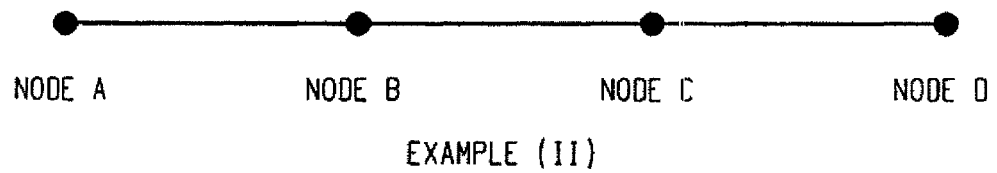

FIG. 6 is an illustrative arrangement of a Search Screen generated by a CPU under the instruction of computer-readable logic of the present invention. The user can input one or more key words relating to symptoms, medications, therapeutic agents, ailments, diseases, viral infections, physicians, hospitals, insurance providers, and any other term into a key-word field, and optionally narrow the scope of the search to a particular subcategory of the entire network. For example, the scope of the search can be narrowed by specifying an insurance provider, the number of degrees of separation between the user and another registered physician that could possess knowledge of interest to the user, registered physicians within a predetermined geographic distance from the location of a user or other person, a specific context, and any other specification that will narrow the scope of the search for the key words input by the user.

Selecting the Go button instructs the system to initiate the search based on the user-specified key words entered into the key-word field. Computer-readable logic instructs the search to retrieve all possible results that satisfy the key words. These results are then filtered to remove any results that do not comply with the specifications, or otherwise fall within the desired subcategory selected by the user.

Figure 7:
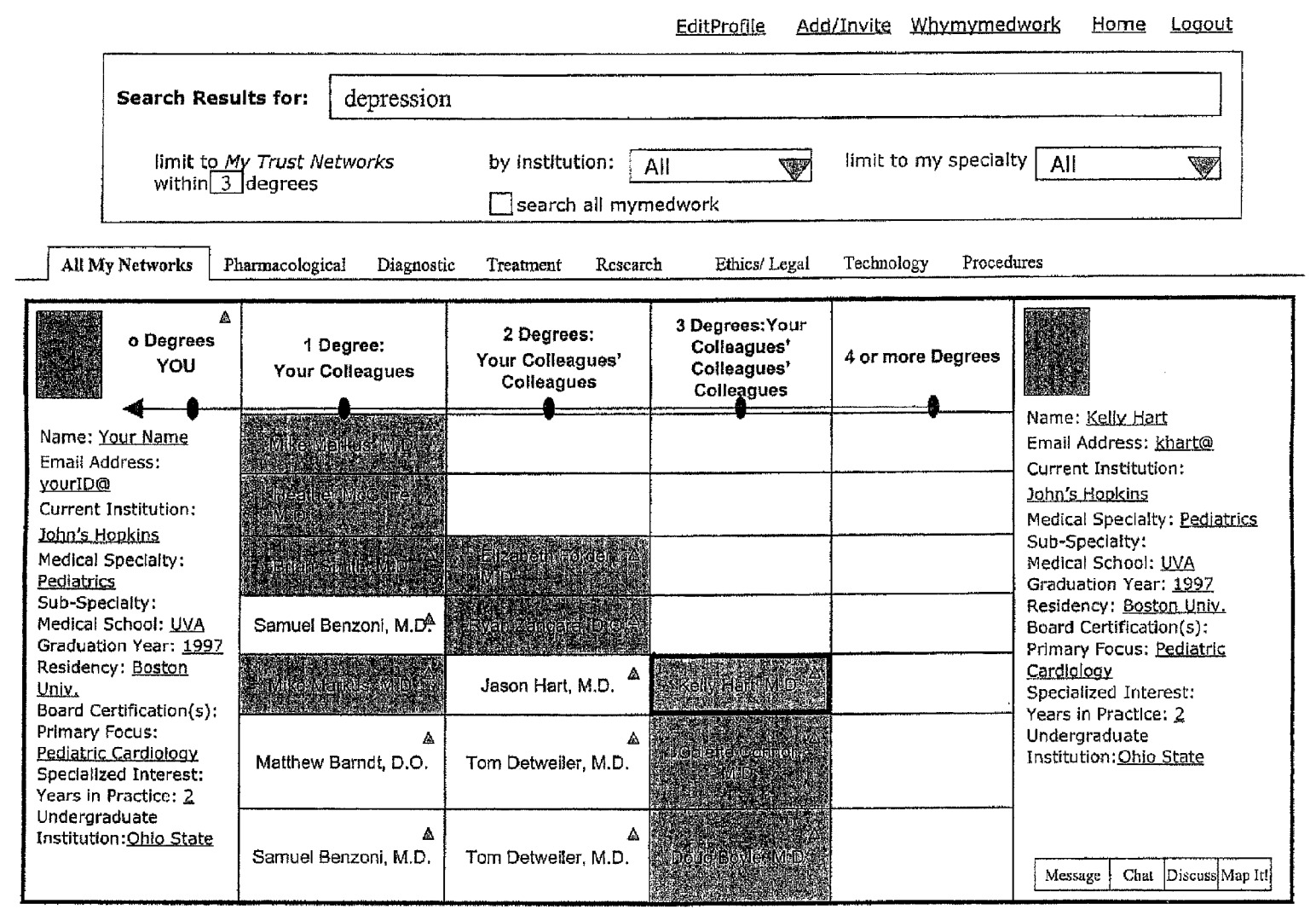

FIG. 7 is an illustrative Search-Results screen generated according to instructions included in computer-readable logic of the present invention and displayed by the computer terminal. The search results include the names of physicians in the user's personal communication network that satisfy the search criteria input into the Search Screen. The results in FIG. 7 are tabulated with the first-degree, or other most-closely-related contacts that satisfy the query listed at the top of the table. The physicians that satisfy the query can possess knowledge or experience with respect to a certain ailment, practice within a predetermined geographic distance from a user-specified location, or otherwise be relevant with respect to the key words and other criteria used to perform the search.

As shown in FIG. 7, first-degree contacts listed in the first column directly next to the user's profile are physicians who have been personally invited by the user to join the user's personal communication network. The second-degree, or other second most-closely-related contacts are listed in the second column, but starting in rows directly beneath rows that list the most-closely-related contacts. For example, in FIG. 7, the first-degree contacts returned by the search are listed in the first column, and in the first two rows. In rows 3 and 4, the second-degree contacts are listed in the second column, each of said second-degree contacts being separated from the user's profile by a first-degree contact.

The first-degree contact that separates each second-degree contact from the user in FIG. 7 is a node in the chain of communication that extends from the user to the second-degree contact. Obviously, the user trusts the first degree contact, otherwise the user would not have extended an invitation to the first-degree contact to join the user's personal communication network. The user can make a preliminary determination about the trustworthiness of the second-degree contact by considering the first-degree contact (Node B) between the user (Node A) and the second-degree contact (Node C). For example, if the first-degree contact is a physician in a teaching hospital who is primarily concerned with academic research of a particular disease, the second-degree contact known by the first-degree contact is likely to have a similar background. In another example, the first-degree contact may have become less reputable in light of recent accusations of falsifying experimental data. If the second-degree contact was at one time a research partner with the first-degree contact, the user can exercise caution in consulting with the second-degree contact. Regardless of the relationship with the first-degree contact, the user can often obtain an initial impression on the second-degree contact based on his familiarity with the first-degree contact.

Referring once again to FIG. 7, the computer-readable logic of the present invention can also cause $n^{th}$ degree contacts to be displayed in an arrangement similar to that above for first and second-degree contacts. Third-degree contacts shown in FIG. 7 are listed in the third column from the user and start on row 5. Again, the user can gain a preliminary impression of the trustworthiness of the third-degree contact by considering the trustworthiness of the first and second-degree contacts between the third-degree contact and the user.

Those personal-communication-network members who satisfy the search criteria, key words, etc. . . . entered with the Search Screen can be identified as those search results that are highlighted. Additionally, one or more of the search results can be selected with a cursor, border, or other visual indicia, and profile information of the selected search result can be shown in a profile window displayed by a display device operatively coupled to the computer terminal by computer-readable logic. The user, once making a preliminary determination about the trustworthiness of the selected search result, can communicate with the selected search result via contact information provided in the profile window. Additionally, contact options are presented in the profile window to provide the user with alternate methods of contacting the selected search result. Examples of contact options include Message, allowing the user to send a message to the selected contact with a messenger feature of the present invention; Chat, which allows the user and the selected contact to enter a chat room provided by the present invention; and other contact options.

By way of example, authorized users are permitted to enter a statistical environment where they can obtain statistical information about physicians that are members of at least one personal communication network. Access to the statistical environment can be restricted by a login or other security feature that would allow authorized users into the statistical environment while minimizing the ability of unauthorized users to gain access to the statistical environment. Similar to the Search Screen, the statistical environment will permit the user to specify the statistics the user wishes to observe. For example, the user can select to observe at least one of the opinion leaders, the innovators, and any other class of physicians. Further, the opinion leaders, innovators, and other classes of physicians displayed according to the present invention can be limited to particular contexts, geographic regions, and other specifications similar to those recited above to limit the search results displayed on the Search-Results Screen.

Although the system and method are described herein with reference to the medical field, it is understood that the system and method of the present invention can be employed in any field. Further, the search results can be arranged in any manner that permits observation of the chain of communication between the user and members of the user's personal communication network returned by the search.

The invention claimed is:

1. A system for displaying search results of a search of a personal communication network, the personal communication network including a plurality of members, the system comprising:
    at least one processor programmed to:
        gather explicit personal-communication-network data from information entered on the personal communication network;
        gather implicit personal-communication-network data from activities conducted on the personal communication network, wherein the implicit personal-communication-network data includes historical data describing interactions of the personal-communication-network members within the personal communications network;
        search the gathered explicit and implicit personal-communication-network data for a key word or phrase identified by a party conducting the search to identify at least one personal-communication-network member related to the key word or phrase, wherein the search includes making inferences about at least one personal-communication-network member based upon the key word or phrase; and
        display results of the search by:
            showing the at least one personal-communication-network member that is identified by the search;
            showing how the party conducting the search is linked to the at least one personal-communication-network member identified by the search by visually depicting the degree of separation in the personal communication network between the party conducting the search and the at least one personal-communication-network member; and
            showing at least one field of interest linking the party conducting the search to the at least one personal-communication-network member identified by the search.

2. The system of claim 1, wherein the at least one processor is further programmed to:
  display the results of the search by visually illustrating a complete social-network path in the personal communication network between the party conducting the search and the at least one personal-communication-network member identified by the search.

3. The system of claim 1, wherein the at least one processor is further programmed to:
  classifying the at least one personal-communication-network member that is identified by the search as an opinion leader or innovator in a field of interest based at least in part on inferences made about the at least one personal-communication-network member, the inferences based upon the gathered explicit and implicit personal-communication-network data; and
  indicate in the results whether a personal-communication-network member identified in the results is an opinion leader or innovator in a field of interest based upon the classifying.

4. The system of claim 3, wherein the classifying involves a relative comparison of a personal-communication-network member's quantity of personal-communication-network memberships within the field of interest to another personal-communication-network member's quantity of personal-communication-network memberships within the field of interest.

5. The system of claim 1, wherein the at least one processor is further programmed to:
  indicate in the results a relationship between the party conducting the search and the at least one personal-communication-network member that is identified by the search or a relationship between the party conducting the search and an author of the at least one personal-communication-network communication that is identified by the search;
  wherein the relationship is determined by a search of at least one of the gathered explicit and implicit personal-communication-network data and is expressed in terms of degrees of separation to the party conducting the search.

6. The system of claim 1, wherein the results are displayed in a tabular form, wherein the tabular form has at least one horizontal row and at least one vertical column wherein the at least one row shows a personal-communication-network path from the party conducting the search to the at least one personal-communication-network member, and the at least one column shows the degrees of separation between the at least one personal-communication-network member and the party conducting the search.

7. The system of claim 1, wherein the personal communication network includes a plurality of nodes representing the personal-communication-network members, each of the plurality of nodes connected to another node in the personal-communication-network by a communication link, the communication link specifically labeled with a field of interest between the corresponding nodes, and wherein the implicit and explicit personal-communication-network data is gathered from communication links by and among members of the personal communication network.

8. The system of claim 1, wherein at least one of:
  the implicit personal-communication-network data is based upon a quantity of personal communication-network keyword or name searches that list the member in the search results; and
  the implicit personal-communication-network data is based upon the number of times that other personal-communication-network members access the member's profile.

9. The system of claim 1, wherein the implicit personal-communication-network data relates to personal-communication-network keyword searching that the personal communication-network members have performed.

10. A computer implemented method for displaying search results of a search of a personal communication network, the personal communication network including a plurality of members, the method comprising:
  gathering explicit personal-communication-network data from information entered on the personal communication network;
  gathering implicit personal-communication-network data from activities conducted on the personal communication network, wherein the implicit personal-communication-network data includes historical data describing interactions of the personal-communication-network members within the personal communications network;
  searching the gathered explicit and implicit personal-communication-network data for a key word or phrase identified by a party conducting the search to identify at least one personal-communication-network member related to the key word or phrase, wherein the search includes making inferences about at least one personal-communication-network member based upon the key word or phrase; and
  displaying results of the search by showing the at least one personal-communication-network member that is identified by the search, showing how the party conducting the search is linked to the at least one personal-communication-network member identified by the search, and showing at least one field of interest linking the party conducting the search to the at least one personal-communication-network member identified by the search;
  wherein the personal communication network includes a plurality of nodes representing the personal-communication-network members, each of the plurality of nodes connected to another node in the personal-communication-network by an explicitly defined communication link, wherein the implicit and explicit personal-communication-network data is gathered from communication links by and among members of the personal communication network.

11. The method of claim 10, wherein the at least one processor is further programmed to:
  display the results of the search by visually illustrating a complete social-network path in the personal communication network between the party conducting the search and the at least one personal-communication-network member identified by the search.

12. The method of claim 10, wherein the at least one processor is further programmed to:
  classifying the at least one personal-communication-network member that is identified by the search as an opinion leader or innovator in a field of interest based at least in part on inferences made about the at least one personal-communication-network member, the inferences based upon the gathered explicit and implicit personal-communication-network data; and
  indicate in the results whether a personal-communication-network member identified in the results is an opinion leader or innovator in a field of interest based upon the classifying.

13. The method of claim 10, wherein the at least one processor is further programmed to:
- indicate in the results a relationship between the party conducting the search and the at least one personal-communication-network member that is identified by the search or a relationship between the party conducting the search and an author of the at least one personal-communication-network communication that is identified by the search;
- wherein the relationship is determined by a search of at least one of the gathered explicit and implicit personal-communication-network data and is expressed in terms of degrees of separation to the party conducting the search.

14. The method of claim 10, wherein at least one of:
- the implicit personal-communication-network data is based upon a quantity of personal communication-network keyword or name searches that list the member in the search results; and
- the implicit personal-communication-network data is based upon the number of times that other personal-communication-network members access the member's profile.

15. The method of claim 10, wherein the implicit personal-communication-network data relates to personal-communication-network keyword searching that the personal communication-network members have performed.

16. One or more processors programmed to perform a method for displaying search results of a search of a personal communication network, the personal communication network including a plurality of members, the method comprising:
- gathering explicit personal-communication-network data from information entered on the personal communication network;
- gathering implicit personal-communication-network data from activities conducted on the personal communication network, wherein the implicit personal-communication-network data includes historical data describing interactions of the personal-communication-network members within the personal communications network;
- searching the gathered explicit and implicit personal-communication-network data for a key word or phrase identified by a party conducting the search to identify at least one personal-communication-network member related to the key word or phrase, wherein the search includes making inferences about at least one personal-communication-network member based upon the key word or phrase; and
- displaying results of the search by showing the at least one personal-communication-network member that is identified by the search, showing how the party conducting the search is linked to the at least one personal-communication-network member identified by the search, and showing at least one field of interest linking the party conducting the search to the at least one personal-communication-network member identified by the search;
- wherein the personal communication network includes a plurality of nodes representing the personal-communication-network members, each of the plurality of nodes connected to another node in the personal-communication-network by an explicitly defined communication link, wherein the implicit and explicit personal-communication-network data is gathered from communication links by and among members of the personal communication network.

17. A non-transitory computer readable medium carrying software which contains one or more processors to perform a method for displaying search results of a search of a personal communication network, the personal communication network including a plurality of members, the method comprising:
- gathering explicit personal-communication-network data from information entered on the personal communication network;
- gathering implicit personal-communication-network data from activities conducted on the personal communication network, wherein the implicit personal-communication-network data includes historical data describing interactions of the personal-communication-network members within the personal communications network;
- searching the gathered explicit and implicit personal-communication-network data for a key word or phrase identified by a party conducting the search to identify at least one personal-communication-network member related to the key word or phrase, wherein the search includes making inferences about at least one personal-communication-network member based upon the key word or phrase; and
- displaying results of the search by showing the at least one personal-communication-network member that is identified by the search, showing how the party conducting the search is linked to the at least one personal-communication-network member identified by the search, and showing at least one field of interest linking the party conducting the search to the at least one personal-communication-network member identified by the search;
- wherein the personal communication network includes a plurality of nodes representing the personal-communication-network members, each of the plurality of nodes connected to another node in the personal-communication-network by an explicitly defined communication link, wherein the implicit and explicit personal-communication-network data is gathered from communication links by and among members of the personal communication network.

18. A system for displaying search results of a search of a personal communication network, the personal communication network including a plurality of members, the system comprising:
- at least one processor programmed to:
  - gather personal-communication-network data from information entered on the personal communication network and activities conducted on the personal communication network, wherein implicit personal-communication-network data includes historical data describing interactions of the personal-communication-network members within the personal communications network;
  - search the gathered personal-communication-network data for a key word or phrase identified by a party conducting the search to identify at least one personal-communication-network member related to the key word or phrase; and
  - display results of the search by:
    - showing the at least one personal-communication-network member that is identified by the search;
    - showing how the party conducting the search is linked to the at least one personal-communication-network member identified by the search by visually depicting the degree of separation in the personal communication network between the party conducting the search and the at least one personal-communication-network member; and showing at least one field of interest linking the party conducting the search to the at least one personal-communication-network member identified by the search;

wherein the personal communication network includes a plurality of nodes representing the personal-communication-network members, each of the plurality of nodes connected to another node in the personal-communication-network by an explicitly defined communication link, wherein the implicit and explicit personal-communication-network data is gathered from communication links by and among members of the personal communication network.

19. The system of claim 7, wherein the at least one processor is further programmed to show how the party conducting the search is linked to the at least one personal-communication-network member by showing a full social-network path between the party conducting the search and the at least one personal-communication-network member.

20. The method of claim 10, further including displaying results of the search by visually depicting the degree of separation in the personal communication network between the party conducting the search and the at least one personal-communication-network member.

\* \* \* \* \*